United States Patent
Buer et al.

(10) Patent No.: US 12,040,881 B2
(45) Date of Patent: Jul. 16, 2024

(54) POSITION-BASED ACCESS TO SATELLITE NETWORKS FOR SATELLITE TERMINALS

(71) Applicant: Viasat, Inc., Carlsbad, CA (US)

(72) Inventors: Kenneth V. Buer, Gilbert, AZ (US); Clifford K. Burdick, Vista, CA (US); David H. Irvine, Carlsbad, CA (US); Philip A. Lampe, Encinitas, CA (US); Timothy J. Martin, Carlsbad, CA (US); Brian T. Sleight, Carlsbad, CA (US)

(73) Assignee: Viasat, Inc., Carlsbad, CA (US)

( * ) Notice: Subject to any disclaimer, the term of this patent is extended or adjusted under 35 U.S.C. 154(b) by 6 days.

(21) Appl. No.: 17/717,410

(22) Filed: Apr. 11, 2022

(65) Prior Publication Data
US 2022/0231757 A1    Jul. 21, 2022

Related U.S. Application Data

(63) Continuation of application No. 15/167,913, filed on May 27, 2016, now Pat. No. 11,374,650.

(51) Int. Cl.
*H04B 7/185* (2006.01)
*G01S 19/05* (2010.01)
*G01S 19/42* (2010.01)

(52) U.S. Cl.
CPC ..... *H04B 7/18519* (2013.01); *H04B 7/18517* (2013.01); *H04B 7/18521* (2013.01);
(Continued)

(58) Field of Classification Search
CPC ............ H04B 7/18519; H04B 7/18517; H04B 7/18521; H04B 7/18513; H04B 7/18523; G01S 19/05; G01S 19/42
See application file for complete search history.

(56) References Cited

U.S. PATENT DOCUMENTS

| 5,983,071 A | 11/1999 | Gagnon et al. |
| 6,009,116 A | 12/1999 | Bednarek et al. |

(Continued)

OTHER PUBLICATIONS

Automatic Satellite Systems, www.accessantennas.com.au, Aug. 3, 2015, Australia, 4 pgs.
(Continued)

*Primary Examiner* — Ankur Jain
(74) *Attorney, Agent, or Firm* — Holland & Hart LLP

(57) ABSTRACT

The described features generally relate to receiving one or more positioning signals at a satellite terminal during installation of the satellite terminal at a customer premises, and providing position-based access to a satellite communications system based on a satellite terminal installation position determined from the received positioning signals. The determined installation position of the satellite terminal may then be employed for various network access techniques, such as providing access to the satellite communications system, providing position-based content, or restricting content via the satellite communications system based on the determined installation position. In some examples the determined installation position of the satellite terminal may be used to approximate a propagation delay between the satellite terminal and various devices of the satellite communications system, such as a serving satellite and/or a serving gateway, to improve device synchronization and radio frequency spectrum resource utilization.

24 Claims, 13 Drawing Sheets

(52) U.S. Cl.
CPC .............. *G01S 19/05* (2013.01); *G01S 19/42* (2013.01); *H04B 7/18513* (2013.01); *H04B 7/18523* (2013.01)

(56) References Cited

U.S. PATENT DOCUMENTS

| | | |
|---|---|---|
| 6,252,547 B1 | 6/2001 | Perry et al. |
| 7,592,953 B2 | 9/2009 | Morana |
| 7,667,643 B2 | 2/2010 | Handermann et al. |
| 7,784,070 B2 | 8/2010 | Chang et al. |
| 8,789,116 B2 | 7/2014 | Miller et al. |
| 8,995,415 B2 | 3/2015 | Yang et al. |
| 2003/0181162 A1 | 9/2003 | Matula |
| 2008/0158078 A1 | 7/2008 | Allen et al. |
| 2009/0100530 A1* | 4/2009 | Chen ................... H04L 9/3271 726/29 |
| 2015/0341109 A1* | 11/2015 | DiBiaso ............. H04B 7/18513 455/13.2 |
| 2018/0288066 A1* | 10/2018 | Brockhuus ............ H04L 67/306 |

OTHER PUBLICATIONS

Compact, Lightweight TV at sea, www.intelliantech.com/Sattv/i-Series/i2, Aug. 3, 2015, 5 pgs.
Satellite TV Antenna Systems, www.raymarine.com/, Aug. 3, 2015, 16 pgs.
Star Choice Dish High Definition Dish Size, www.usedottawa.com, 2 pgs.
TracVision TV6 Marine Satellite Television System, www.kvh.com/Leisure/Marine-Systems/Television/TV-series/TracVision-TV6.aspx, 2 pgs.
Your R.V. and Mobile Satellite Specialists, www.antennawizard.co/bell.html, 1 pg.

* cited by examiner

POSITION-BASED ACCESS TO SATELLITE NETWORKS FOR SATELLITE TERMINALS

CROSS REFERENCE

The present application for patent is a Continuation of U.S. patent application Ser. No. 15/167,913 by BUER et al., entitled "POSITION-BASED ACCESS TO SATELLITE NETWORKS FOR SATELLITE TERMINALS" filed May 27, 2016, each of which are expressly incorporated by reference in its entirety herein.

BACKGROUND

In a satellite communications system, signals from a communications satellite may be distributed over one or more relatively wide coverage areas, and services may be provided based on the installation locations (e.g., installation positions) of various terminals within the coverage area(s). In some examples, a coverage area may overlap borders between various geographic regions, such as nations, states, terrestrial regions (e.g., land or water), time zones, administrative service areas, and the like. In some satellite communications systems, access to networks and/or content over the network may be based on the installation position of a satellite terminal, such as a geographic region within which the satellite terminal is installed or is being installed. To support position-based access, some satellite communications systems may rely on a predetermined position of a satellite terminal, such as a subscriber property address, which may be stored at a device of the satellite communications system. A predetermined satellite terminal position may have questionable accuracy, and/or may lack an ability to determine whether a satellite terminal has been moved (e.g., been installed at a new location).

In some satellite communications systems, a coverage area of the satellite includes satellite terminals that are located at a variety of distances from a satellite. Signals between the satellite and each of the satellite terminals experience propagation delays between transmitting the signal and receiving the signal, where the propagation delay depends on the propagation speed and the distance between the sending device and the receiving device. Therefore, satellite terminals at various distances from a serving satellite experience different propagation delays. In some satellite communications systems the propagation delay associated each satellite terminal is not known prior to installation, which can cause synchronization problems associated with network entry or an inefficient use of radio frequency spectrum resources.

SUMMARY

The described features generally relate to receiving one or more positioning signals at a satellite terminal during installation of the satellite terminal at a customer premises, and providing access to a satellite communications system based on a satellite terminal installation position determined based at least in part on the received positioning signals. In some examples the satellite terminal may receive one or more positioning signals, from which the installation position of the satellite terminal may be determined. In some examples a single ranging signal may be received, where an installation position is determined, for example, from a determined distance from a transmitting device and an orientation between the transmitting device and the satellite terminal. In some examples a plurality of positioning signals may be received, and an installation position may be determined from a triangulation calculation. For example, a satellite terminal being or to be installed at a customer premises may be configured to receive a plurality of positioning signals from a global navigational satellite system (GNSS) constellation (e.g., a Global Positioning System (GPS) constellation, a Globalnaya Navigazionnaya Sputnikovaya Sistema (GLONASS) constellation, etc.) to determine the installation position of the satellite terminal. The determined installation position of the satellite terminal may then be used for various network access techniques, such as providing network entry access to the satellite communications system, providing position-based content, or restricting content via the satellite communications system based on the determined installation position. In some examples the determined installation position of the satellite terminal may be used in approximating a propagation delay between the satellite terminal and a serving communications satellite (or other device of the satellite communications system) to improve device synchronization and radio frequency spectrum resource utilization.

In some examples, a satellite terminal may perform the steps described herein for determining an installation position of the satellite terminal, and providing location-based access to a satellite communications system. For example, a satellite terminal being installed at a customer premises may have a communications transceiver configured for communications with a communications satellite, and may also have a positioning receiver (e.g., a GPS receiver) configured to receive positioning signals at the satellite terminal. The satellite terminal may have a processor configured to execute instructions stored in memory at the satellite terminal to manage various aspects of location-based access to the satellite communications system (e.g., determining an installation position based on received positioning signals, allowing/restricting access, receiving location-based content, managing signal timing, etc.). In some examples a satellite terminal may be configured to forward position information corresponding to the satellite terminal installation position (e.g., forwarding an installation position determined by the satellite terminal based on positioning signals received at the satellite terminal during installation of the satellite terminal at a customer premises) to another device of a satellite communications system (e.g., a consumer premises equipment, the communications satellite, an associated gateway, a network device, etc.). The other device may be configured to receive the installation position information from the satellite terminal, and have instructions stored in memory and executable by a processor to provide location-based access to the satellite communications system for the satellite terminal. Thus, in some examples, other devices of a satellite communications system may provide for location-based access for a satellite terminal based on positioning signals received at the satellite terminal.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
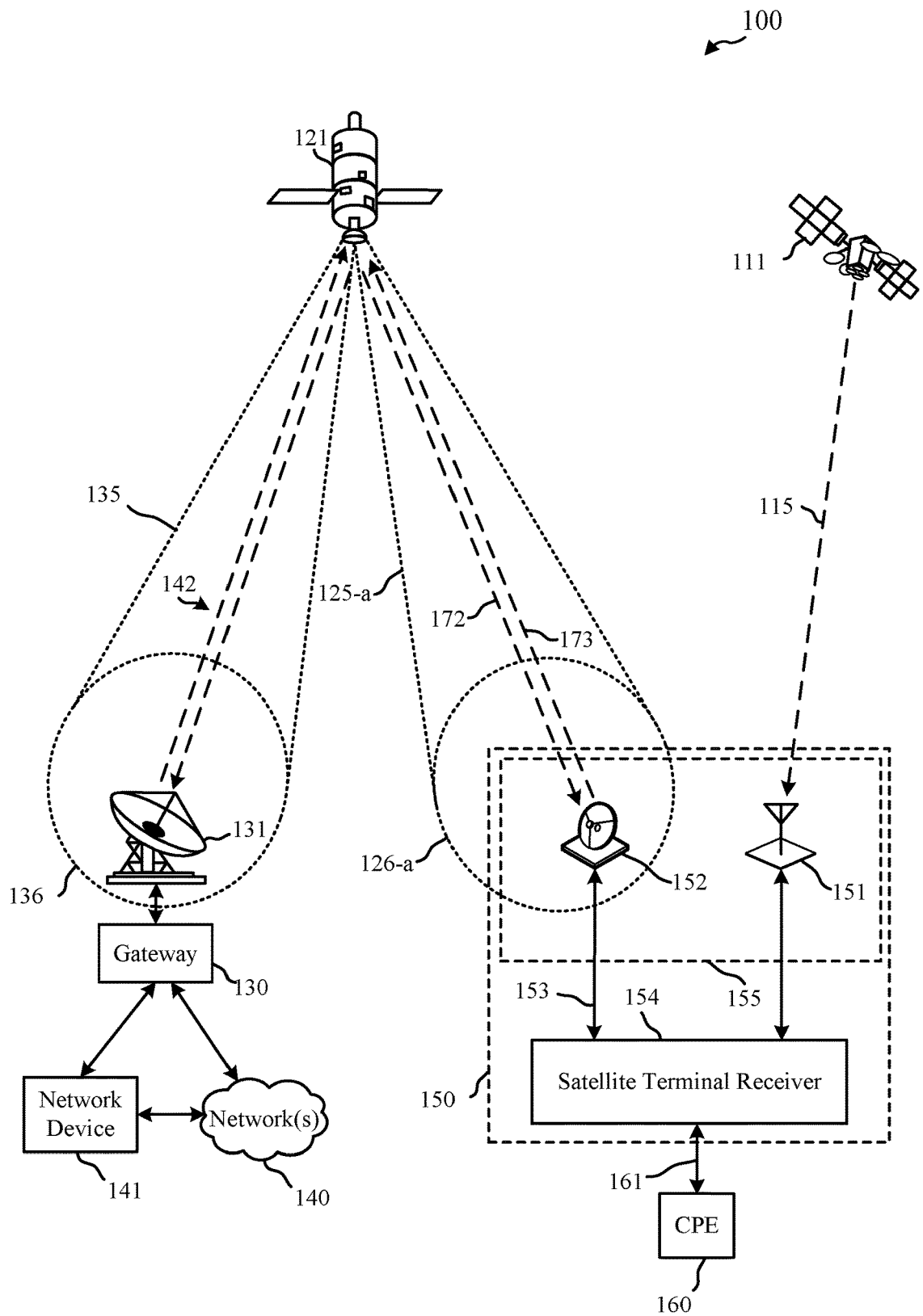
FIG. 1 shows a diagram of a satellite communication environment in accordance with aspects of the present disclosure.

A satellite terminal may employ a communications antenna to establish a communications link between a satellite communications system and the satellite terminal. The communications link may be configured for bi-directional communications (e.g., transmitting and receiving, etc.), or uni-directional communications (e.g., receiving), in some cases. The satellite terminal may also be configured with an auxiliary antenna, such as a global navigation satellite system (GNSS) antenna configured to receive positioning signals from a GNSS satellite constellation (e.g., Global Positioning System (GPS), Globalnaya Navigazionnaya Sputnikovaya Sistema (GLONASS), etc.). The auxiliary antenna may be located in the proximity of the satellite terminal, and in some examples the antennas may be co-located within a satellite terminal antenna assembly.

According to aspects of the present disclosure, positioning signals received at a satellite terminal may be used to determine an installation position (e.g., a location at a customer premises, etc.) of the satellite terminal being installed or to be installed, which may subsequently be employed for providing position-based access to a satellite communications system. For example, a determined installation position may be used to determine whether the satellite terminal has rights to access the satellite communications system. In some examples, determining whether the satellite terminal has access rights to the satellite communications system may include comparing the determined installation position with a predetermined installation position (e.g., a position of initial installation), or identifying that the determined installation position is within one of various geographic regions (e.g., a national region, a state region, a municipal region, a time zone, a service region, etc.). In some examples, a satellite terminal may receive position-specific content, and/or have access to content restricted based on the determined installation position.

In some examples subsequent positioning signals may be received at the satellite terminal, and used to identify that the satellite terminal has been moved (e.g., determine a second installation position of the satellite terminal). Upon determining a difference in installation positions of the satellite terminal, a terminal setup procedure may be initiated (e.g., a reestablishment of a communications link with the serving satellite, an establishment of a communications link over a different beam of the serving satellite, an establishment of a communications link with a different satellite, a reestablishment of access rights for the satellite terminal, etc.). In some examples, determined installation position information may be used to determine a subscription cost. For example, a subscription cost may be determined based at least in part on a terrestrial or administrative region, such determining a subscription cost based on a state, a country, or any other subscription region a satellite terminal is determined to be installed in. In various examples, the determined installation position may be used to adjust a base subscription cost, a tax rate, a location-dependent surcharge, a location-specific demand fee, or the like. In other examples a subscription cost may be determined based on an identification that a satellite terminal has been moved, such as determining a relatively lower subscription cost for a stationary or fixed installation and a relatively higher subscription cost for a terminal that is determined to have been moved from one installed position to a second installed position (e.g., as identified from positioning signals received at the satellite terminal). In some examples, positioning signals received at the satellite terminal may be used to determine whether a satellite terminal is used as expected (e.g., according to a subscriber agreement, such as determining that a satellite terminal having a stationary installation subscriber agreement being used in a new installation positions, etc.), and the received positioning signals may be used to identify or trigger changes in a subscription cost or a subscription service.

In some examples, a determined installation position may support position-specific network entry and/or synchronization procedures. For example, a signal timing offset can be determined based on the determined installation position of a satellite terminal, where the timing offset may be an approximation of a propagation delay related to signal transmissions between the satellite terminal and another device of the satellite communications system (e.g., a serving communications satellite, a serving gateway, etc.). In some examples the signal timing offset may be further based on the position of the serving communications satellite, which may be used to estimate a distance between the satellite terminal and the communications satellite, and/or a distance between the communications satellite and an associated gateway. The position of the serving satellite may be based on a value stored at the satellite terminal, a signal received from the communications satellite or another device in the satellite communications system (e.g., ephemeris data), or a combination thereof.

Using the signal timing offset, a satellite terminal may, for example, determine a transmission timing (e.g., a time to transmit a network entry signal to be received within a contention slot) and subsequently transmit a network entry signal to the serving communications satellite. By employing the signal timing offset determined from a positioning signal received at the satellite terminal, synchronization between the satellite terminal and a communications satellite may be improved by reducing uncertainties associated with propagation delays between the satellite terminal and the communications satellite. The improved synchronization may enable shorter contention slots associated with network entry, which may allow a greater number of contention slots to be configured in a particular time period. Thus, determining a signal timing offset based at least in part on positioning signals received at a satellite terminal may enable a satellite communications system to improve radio frequency spectrum utilization. After sending the network entry signal, the satellite terminal may receive an adjustment signal from the communications satellite, and adjust the signal timing offset based on the received adjustment signal (e.g., to further improve agreement between the signal timing offset and a signal propagation delay).

This description provides examples, and is not intended to limit the scope, applicability or configuration of embodiments of the principles described herein. Rather, the ensuing description will provide those skilled in the art with an enabling description for implementing embodiments of the principles described herein. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

FIG. 1 shows a diagram of a satellite communications environment 100 in accordance with aspects of the present disclosure. The satellite communications environment 100 includes a satellite communications system, which includes a communications satellite 121, a satellite terminal 150, one or more consumer premises equipments (CPEs) 160 a gateway 130, and one or more network devices 141. As shown in the example of FIG. 1, the satellite communications environment 100 also includes an auxiliary satellite system including one or more auxiliary satellites 111.

The one or more communications satellites 121 in the satellite communications system may include any suitable type of communication satellite configured for wireless communication with the gateway 130 and one or more satellite terminals 150. In some examples, some or all of the communications satellites 121 may be in geostationary orbits, such that their positions with respect to terrestrial devices may be relatively fixed, or fixed within an operational tolerance or other orbital window. In other examples, any appropriate orbit (e.g., low Earth orbit (LEO), medium Earth orbit (MEO), etc.) for one or more satellite(s) 121 of the satellite communications system may be used.

The satellite terminal 150 may include a satellite terminal communications antenna 152 configured for receiving forward link signals 172 from a communications satellite 121. The satellite terminal communications antenna 152 may also be configured to transmit return link signals 173 to a communications satellite 121. Thus, the satellite terminal 150 may be configured for uni-directional or bi-directional communications with one or more communications satellites 121 the satellite communications system. In some examples the satellite terminal communications antenna 152 may be directional. For example, the satellite terminal communications antenna 152 may have a peak gain along a primary axis (e.g., an antenna boresight). In some examples, the peak gain may roll off steeply in off-axis directions. A steep roll-off in antenna gain may be referred to as a narrow field of view of an antenna. In some examples the satellite terminal communications antenna 152 may be configured with a narrow field of view by way of a fixed configuration of focusing and/or reflecting elements such as an antenna having a parabolic dish reflector. In some examples the satellite terminal communications antenna 152 may be configured with a narrow field of view by way of beamforming, where the field of view may be electronically configurable at an array of antenna elements to aim signal transmission and/or reception along a desired direction.

The communications satellite 121 may communicate via a service beam 125-a directed towards a service beam coverage area 126-a that includes the satellite terminal 150. The service beam coverage area 126-a may cover any suitable service area (e.g., circular, elliptical, hexagonal, local, regional, national, etc.) and provide service to any number of satellite terminals 150 located in the service beam coverage area 126-a. In some examples the communications satellite 121 may be a multi-beam satellite and may have multiple service beams, including service beam 125-a, covering multiple beam coverage areas, including service beam coverage area 126-a, which may or may not overlap with adjacent beam coverage areas.

The communications satellite 121 may transmit a forward link signal 172 via the service beam 125-a to be received by the satellite terminal 150. The satellite terminal 150 may receive the forward link signal 172 using a satellite terminal communications antenna 152. To establish a suitable communications link for forward link signals 172 between the satellite terminal 150 and the communications satellite, the forward link signal 172 may be received at the satellite terminal 150 with a signal strength or a signal-to-noise ratio (SNR) above a threshold, which may depend on the alignment and position of the satellite terminal communications antenna 152, and the attenuation environment around the satellite terminal communications antenna 152 (e.g., the attenuation environment between the satellite terminal 150 and the communications satellite 121). The communications satellite 121 may communicate with the gateway 130 by sending and/or receiving signals 142 through one or more gateway beams 135. Gateway beams 135 may, for example, carry communications traffic for one or more satellite terminals 150 (e.g., relayed by the communications satellite 121), or other communications between the communications satellite 121 and the gateway 130.

The satellite communications system may operate using one or more frequency bands. For example, the satellite communications system may operate in the International Telecommunications Union (ITU) Ku, K, or Ka-bands, C-band, X-band, S-band, L-band, and the like.

The satellite terminal communications antenna 152 may transmit a return link signal 173 to the communications satellite 121. To establish a suitable communications link for return link signals 173 between the satellite terminal 150 and the communications satellite, the return link signals 173 may be received at the communications satellite with a signal strength or SNR above a threshold, which may again depend on the alignment and position of the satellite terminal communications antenna 152, and the attenuation environment around the satellite terminal communications antenna 152 (e.g., the attenuation environment between the satellite terminal 150 and the communications satellite 121). For example, the satellite terminal communications antenna 152 may be considered to be properly aligned with a target (e.g., communications satellite 121) when a transmitted signal of the satellite terminal communications antenna 152 has sufficient antenna gain in the direction of the target to permit signal communication having desired performance characteristics. For example, when the satellite terminal communications antenna 152 is properly aligned with the communications satellite 121, the communications satellite 121 may receive return link signals 173 with signal quality above a threshold (e.g., receive return link signals 173 with a signal strength above a signal strength threshold, receive return link signals 173 with a SNR above an SNR threshold, etc.).

The gateway 130 may send and receive signals 142 to and from satellites of the satellite communications system, including communications satellite 121, using the gateway antenna system 131. The gateway antenna system 131 may be two-way capable and designed with adequate transmit power and receive sensitivity to communicate reliably with at least one communications satellite 121 of the satellite communications system. The gateway 130 may also communicate with one or more networks 140. The networks 140 may include a local area network (LAN), metropolitan area network (MAN), wide area network (WAN), or any other suitable public or private network and may be connected to other communications networks such as the Internet, telephony networks (e.g., Public Switched Telephone Network (PSTN), etc.), and/or the like. A network device 141 may be coupled with the gateway 130 and may control aspects of the satellite communication system. In various examples a network device may be co-located or otherwise nearby the gateway 130, or may be a remote installation that communicates with the gateway 130 and/or network(s) 140 via wired and/or wireless communications link(s).

The satellite terminal communications antenna 152 may be part of a satellite terminal antenna assembly 155, which may also include various hardware for mounting the satellite terminal antennas at a customer premises. A satellite terminal antenna assembly 155 may also include circuits and/or processors for converting (e.g., performing frequency conversion, modulating/demodulating, multiplexing/demultiplexing, filtering, forwarding, etc.) between radio frequency (RF) satellite communication signals (e.g., forward link signals 172 and/or return link signals 173), and satellite terminal communications signals 153 transmitted between the satellite terminal communications antenna 152 and a satellite terminal receiver 154. Such circuits and/or processors may be included in an antenna communication assembly, which may also be referred to as a transmit and receive integrated assembly (TRIA). Additionally or alternatively, the satellite terminal receiver 154 may include circuits and/or processors for performing various radio frequency (RF) signal operations (e.g., receiving, performing frequency conversion, modulating/demodulating, multiplexing/demultiplexing, etc.). The satellite terminal antenna assembly 155 may also be known as a satellite outdoor unit (ODU), and the satellite terminal receiver 154 may be known as a satellite indoor unit (IDU).

The satellite terminal 150 may be connected via a wired or wireless connection 161 to one or more consumer premises equipment (CPE) 160 and may provide network access service (e.g., Internet access, etc.) or other communication services (e.g., broadcast media, etc.) to CPEs 160 via the satellite communications system. The CPE(s) 160 may include user devices such as, but not limited to, mobile phones, personal digital assistants (PDAs), other handheld devices, netbooks, notebook computers, tablet computers, laptops, display devices (e.g., TVs, computer monitors, etc.), printers, and the like. The CPE(s) 160 may also include any equipment located at a premises of a subscriber, including routers, firewalls, switches, private branch exchanges (PBXs), Voice over Internet Protocol (VoIP) gateways, and the like. In some examples, the satellite terminal 150 provides for two-way communications between the CPE 160 and network(s) 140 via the satellite communications system and the gateway 130.

The satellite terminal 150 may also include a satellite terminal auxiliary antenna 151. Although the satellite terminal auxiliary antenna 151 may be a separately installed component, the satellite terminal auxiliary antenna 151 may be co-located with the satellite terminal communications antenna in the satellite terminal antenna assembly 155 in some cases. In this manner, the satellite terminal auxiliary antenna 151 may have a known position and/or orientation relative to the satellite terminal communications antenna 152. In various examples, the satellite terminal auxiliary antenna 151 may include or be coupled with circuits and/or processors for receiving, converting, and/or decoding positioning signals 115 received by the satellite terminal auxiliary antenna 151.

In some examples the satellite terminal auxiliary antenna 151 may be an antenna configured to receive positioning signals 115 transmitted by one or more auxiliary satellites 111. For example, the satellite terminal auxiliary antenna 151 may be configured to receive positioning signals 115 from a global navigation satellite system (GNSS) (e.g., GPS, GLONASS, etc.). Additionally or alternatively, the satellite terminal auxiliary antenna 151 may be configured to receive positioning signals 115 from another system, such as a land-based positioning system, or another system not specifically configured for positioning purposes, but nonetheless transmitting signals that may be used to determine the position of a receiving device. In some examples the functions of the satellite terminal communications antenna 152 and the satellite terminal auxiliary antenna 151 as described herein may be combined in a single antenna with a single receiver that can receive transmit return link signals 173, receive forward link signals 172 and/or receive positioning signals 115. Thus, the satellite terminal 150 or a connected device (e.g., a CPE 160, a gateway 130, or a network device 141) may be able to determine an installation position of the satellite terminal 150 based on information in various types of received positioning signals 115.

Although examples of a satellite terminal communications antenna 152 described herein use a two-way satellite communication system for illustrative purposes, the techniques described herein are not so limited. For example, the hardware and techniques described herein could be used on antennas for point-to-point terrestrial links and in some examples may not be limited to two-way communication. In other examples, the hardware and techniques may be used for an initial installation in a receive-only implementation, such as to receive broadcast media at a customer premises.

Figure 2:
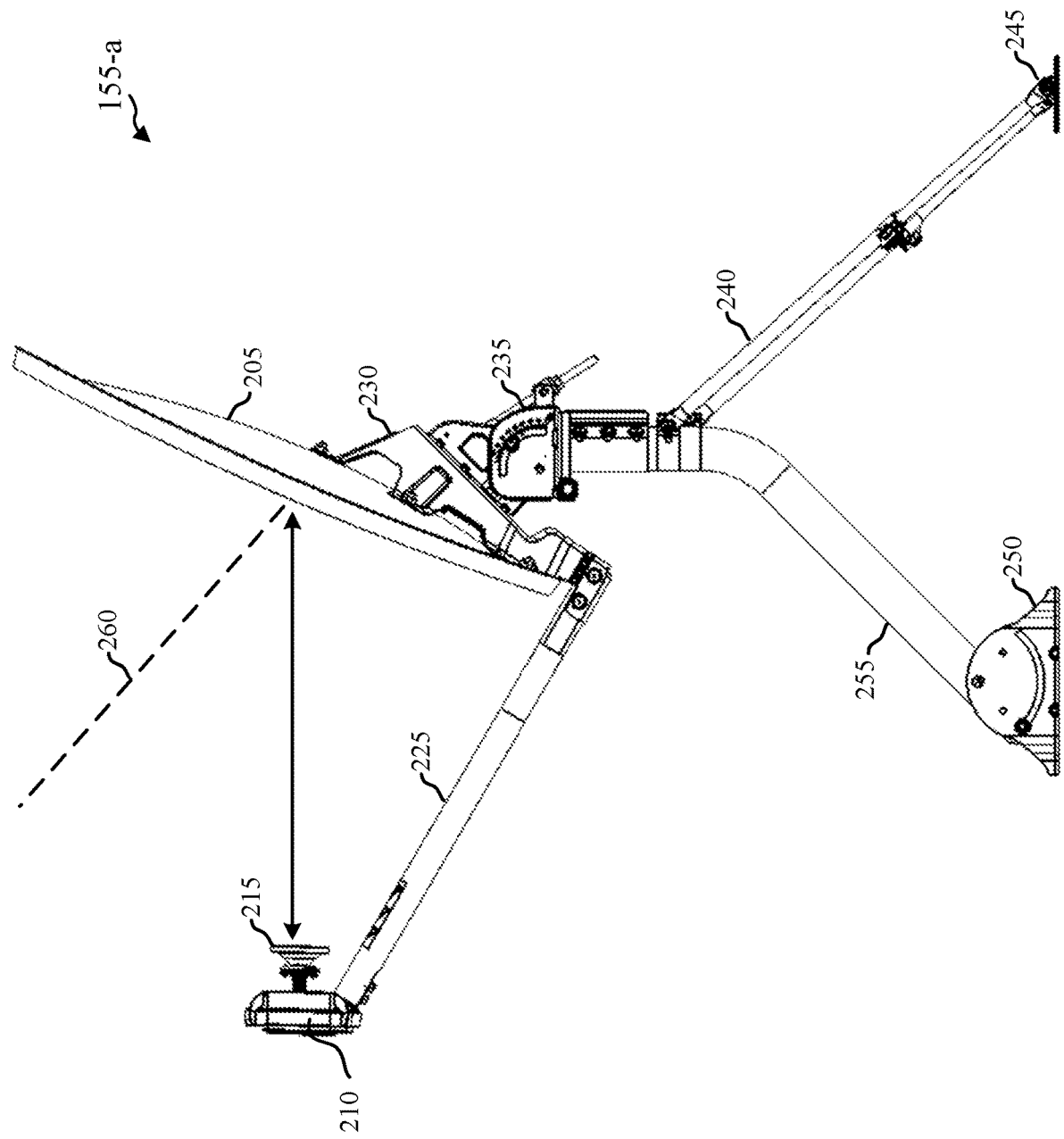
FIG. 2 shows a diagram of an example satellite terminal antenna assembly in accordance with aspects of the present disclosure.

FIG. 2 shows a diagram of an example satellite terminal antenna assembly 155-*a* in accordance with aspects of the present disclosure. The satellite terminal antenna assembly 155-*a* may be an example of aspects of the satellite terminal antenna assembly 155 of satellite terminal 150 described with reference to FIG. 1. The satellite terminal antenna assembly 155-*a* includes an antenna communication assembly 210, which houses a satellite terminal communications antenna and a satellite terminal auxiliary antenna, and a mounting structure. The satellite terminal communications antenna may be an example of satellite terminal communications antenna 152 described with reference to FIG. 1. The satellite terminal auxiliary antenna may be an example of satellite terminal auxiliary antenna 151 described with reference to FIG. 1.

The satellite terminal antenna assembly 155-*a* includes a reflector 205 mounted to a mast 255 via a mounting bracket assembly 235. On the other end, the mast 255 may attach to a mounting surface at a customer premises via a foot 250. The foot 250 may be, for example, a mounting bracket that can be used to affix the mast 255 to a structure. In some examples, the mast 255 is also supported by legs 240 that provide further attachment and stability using mounting brackets 245 to attach to the structure. One or more of the foot 250 and the mounting brackets 245 may function as an adjustable mounting device. The mast 255 may be installed and adjusted (e.g., using adjustments on legs 240) such that the top portion is plumb (e.g., perpendicular to the horizon within measurable tolerances of the installer), allowing the elevation and azimuth of the reflector 205 to be adjusted (e.g., adjusted independently) via the mounting bracket assembly 235. The installer may then position the reflector 205 to the proper azimuth, elevation, and skew. The mounting bracket assembly 235 can include azimuth, elevation, and skew adjustments of the reflector 205 relative to the mast 255. Elevation refers to the angle between the satellite terminal antenna assembly 155-*a* and the horizon, which may be measured with reference to the satellite terminal communications antenna boresight 260. Azimuth refers to the angle between the satellite terminal communications antenna boresight 260 and a direction of true north in a horizontal plane. Skew refers to the angle of rotation about the satellite terminal communications antenna boresight 260.

The satellite terminal communications antenna boresight 260 may generally illustrate a principal axis (e.g., direction of maximum gain, etc.) of the satellite terminal antenna assembly 155-*a* that, during installation, may be aligned along a direction between the satellite terminal antenna assembly 155-*a* and a communications satellite 121. By aligning the satellite terminal communications antenna boresight 260 in this manner, the satellite terminal communications antenna 152 may have an optimal gain and/or sensitivity with respect to communications with a communications satellite 121.

The satellite terminal antenna assembly 155-*a* may, for example, be initially pointed coarsely by an installer, such that the satellite terminal communications antenna boresight 260 is pointed in the general direction of a communications satellite 121. The initial azimuth, elevation, and skew angles for pointing the satellite terminal antenna assembly 155-*a* may be determined by the installer based on the known position of the satellite and the known geographic installation position where the satellite terminal antenna assembly 155-*a* is being installed. In some examples the initial azimuth, elevation, and skew angles may be determined based the position as determined by positioning signals received at the satellite terminal antenna assembly 155-*a*. Once the satellite terminal antenna assembly 155-*a* is coarsely positioned and/or oriented in the general direction of the communications satellite 121, the elevation and/or azimuth angles can be further adjusted by the installer to fine tune the pointing until the satellite terminal communications antenna boresight 260 is sufficiently pointed at the communications satellite 121.

For example, a measurement device, such as a power meter, may be used to directly measure the signal strength of the received forward link signal 172. Additionally or alternatively, a measurement device may be used to measure some other metric or characteristic indicating the signal strength of the received forward link signal 172. The measurement device may for example be an external device that the installer temporarily attaches to the electrical feed. As another example, the measurement device may be integrated into the transceiver (e.g., integrated into the antenna communication assembly 210), or some other portion of a satellite terminal 150. The measurement device may, for example, produce audible tones indicating signal strength to assist the installer in pointing the satellite terminal antenna assembly 155-*a*. In some examples the satellite terminal antenna assembly 155-*a* may be used to transmit return link signal 173 to the communications satellite 121, which may be forwarded to a gateway 130 for measurement. In such examples, signal characteristics may be determined at the gateway 130, and diagnostic information associated with the installation procedure may be returned via the satellite as a forward link signals 172 to the satellite terminal antenna assembly 155-*a* to facilitate the fine tuning of the pointing of antenna assembly 155-*a*.

The installer may iteratively adjust the elevation and/or azimuth angle of the satellite terminal antenna assembly 155-*a* until the received or transmitted signal strength (e.g., as measured by the measurement device, gateway, etc.) reaches a predetermined value. In some examples, the installer adjusts the position and/or orientation of the satellite terminal antenna assembly 155-*a* until the received signal strength is maximized. In other words, the installer attempts to position the satellite terminal antenna assembly 155-*a* such that the satellite terminal communications antenna boresight 260 is pointed directly at the communications satellite 121. Once the satellite terminal antenna assembly 155-*a* is sufficiently aligned, the installer can immobilize the mounting bracket assembly 235 to preclude further movement of the satellite terminal antenna assembly 155-*a*.

An antenna communication assembly 210 is attached to the reflector 205 via an arm 225 and a skew plate 230. The antenna communication assembly 210 may include circuits and/or processors to process RF signals transmitted by and/or received at the satellite terminal antenna assembly 155-*a*. In some examples, the antenna communication assembly 210 may be a transmit and receive integrated assembly (TRIA), which may be coupled with a satellite IDU (e.g., a satellite terminal receiver 154 as described with reference to FIG. 1) for a satellite terminal (e.g., a satellite terminal 150 as described with reference to FIG. 1, etc.) via an electrical feed (not shown).

The antenna communication assembly 210 includes a feed horn 215 and a transceiver associated with communication signals transmitted between the satellite terminal communications antenna 152 and a communication satellite (e.g., a communications satellite 121 of a satellite communications system). The antenna communication assembly 210 may include various circuits and/or processors to support satellite communications, where such components may be assembled into a housing with the feed horn 215 opening towards the reflector 205. Electromagnetic signals of a communications satellite 121, such as forward link signals 172 and/or return link signals 173 described with reference to FIG. 1, may be transmitted by and received at the antenna communication assembly 210 via downlink and uplink beams. Although shown as having a satellite terminal communications antenna boresight 260 that is incident on the reflector 205 (e.g., reflecting into the feed horn 215), some examples of a satellite terminal antenna assembly may not include a reflector 205. In such examples, the satellite terminal communications antenna boresight 260 may be incident on an antenna communication assembly 210 (e.g., directed into the feed horn 215). In some examples, whether a satellite terminal antenna assembly 155 includes a reflector 205 or lacks a reflector 205, the satellite terminal communications antenna boresight 260 may not have a fixed orientation, and instead may be electronically configurable by way of various beam-forming techniques.

The satellite terminal antenna assembly 155-a also includes a satellite terminal auxiliary antenna 151, which may be an example of the satellite terminal auxiliary antenna 151 described with reference to FIG. 1. As illustrated, the components of the satellite terminal auxiliary antenna 151 may be integrated into the antenna communication assembly 210, and may be configured to receive one or more positioning signals 115. For example, the satellite terminal auxiliary antenna 151 may be a GNSS receiver (e.g., a GPS receiver or a GLONASS receiver) incorporating antenna elements and associated receiver and/or processing circuits and memory in a circuit assembly that may be co-located or otherwise coupled with other circuits of the antenna communication assembly. In various examples the satellite terminal auxiliary antenna 151, the antenna communication assembly 210, or some other portion of a satellite terminal 150 may include processing circuits and memory configured to associate received positioning signals 115 with the respective position of the transmitting device, such as an auxiliary satellite 111. In examples where positioning signals 115 are received from an auxiliary satellite 111, such an association may include decoding ephemeris data from the received positioning signals 115. In some examples the satellite terminal auxiliary antenna 151, the antenna communication assembly 210, or some other portion of a satellite terminal 150 may include processing circuits and memory configured for determining an installation position of the satellite terminal antenna assembly 155-a based at least in part on the received positioning signals 115.

In other examples, a satellite terminal antenna assembly 155 may have a different mounting structure than that shown in FIG. 2, such as, for example, a mounting structure suitable to mount on a pole.

Figure 3A:
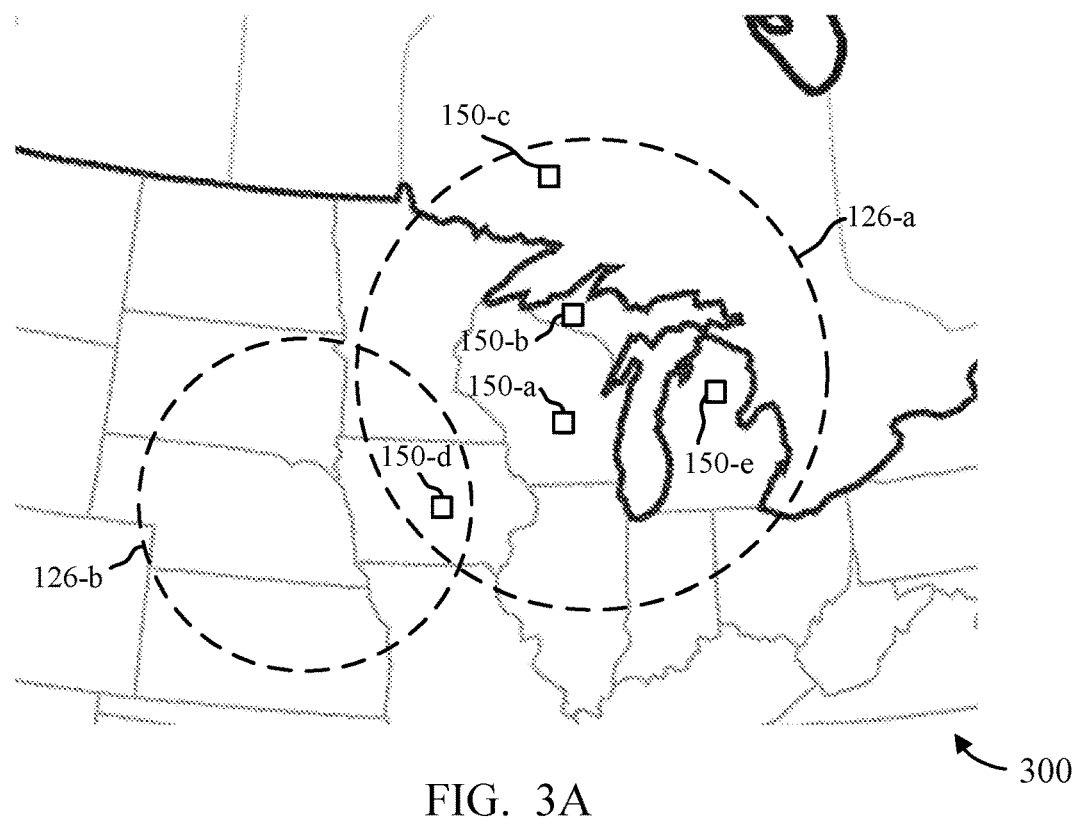
FIGS. 3A and 3B illustrate maps of terminal positions for terminals configured for position-based access, in accordance with aspects of the present disclosure.
Figure 3B:
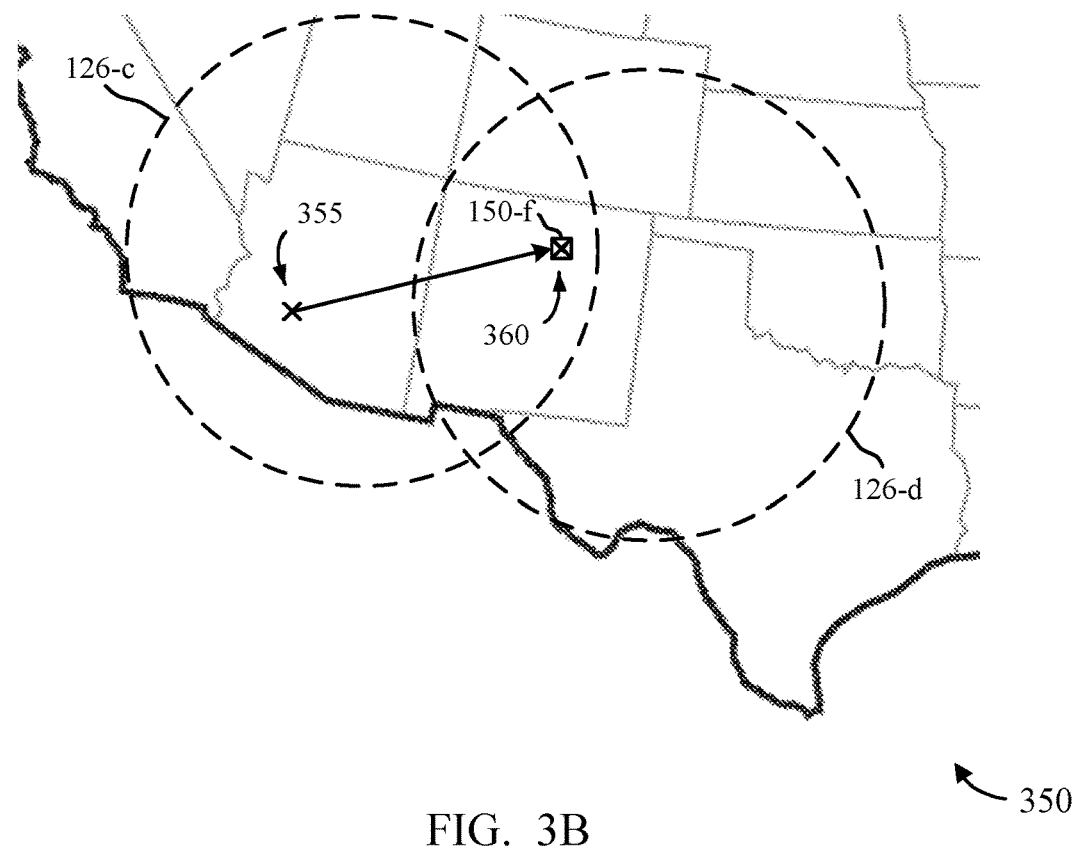

FIGS. 3A and 3B illustrate maps of terminal installation positions for satellite terminals 150 configured for position-based access, in accordance with aspects of the present disclosure. For example, each of the satellite terminals 150 may be configured to receive positioning signals 115, where the received positioning signals may be employed to determine the installation position (e.g., a customer premises, etc.) of the respective satellite terminal 150, as described with reference to FIGS. 1 and 2.

FIG. 3A provides an illustration 300 of a portion of a map of North America including the installation positions of satellite terminals 150-a through 150-e within a first service beam coverage area 126-a and a second service beam coverage area 126-b. In various examples the first service beam coverage area 126-a can be associated with a first service beam 125, and the second service beam coverage area 126-b can be associated with a second service beam 125, where the first service beam 125 and the second service beam 125 may be associated with the same communications satellite 121, or different communications satellites, one of which may be communications satellite 121. Each of the satellite terminals 150 may be configured to receive positioning signals 115, and in various examples the installation positions determined based on the received positioning signals 115 for each satellite terminal 150 may be associated with a geographic area for each of the respective satellite terminals 150.

For example, with respect to national regions, satellite terminals 150-a, 150-b, 150-d, and 150-e may have installation positions determined to be within the United States of America, while satellite terminal 150-c may have an installation position determined to be within Canada. With respect to state regions, satellite terminals 150-b and 150-e may have installation positions determined to be within the state of Michigan, satellite terminal 150-a may have an installation position determined to be within the state of Wisconsin, and satellite terminal 150-d may have an installation position determined to be within the state of Iowa. With respect to time zones, satellite terminals 150-a, 150-b, 150-c, and 150-d may have installation positions associated with the Central Time Zone, and satellite terminal 150-e may have installation positions associated with the Eastern Time Zone. With respect to beam coverage areas, satellite terminal 150-d may have an installation position associated with both the first service beam coverage area 126-a and the second service beam coverage area 126-b.

In various examples, devices of a satellite communications system configured for position-based access to the satellite communications system may restrict access to content based on a determined installation position. For example, in some cases only those satellite terminals 150 in the state of Michigan may be approved for a particular event broadcast. In such cases, it may be determined that satellite terminals 150-a, 150-c, and 150-d may be allowed to access the satellite communications system, but are blocked from receiving the event broadcast.

In various examples, devices of a satellite communications system configured for position-based access to the satellite communications system may be configured to provide and/or receive position-specific content based on a determined installation position of a satellite terminal 150. For example, in some cases it may be desirable to provide advertisement content based on local time. Thus, those satellite terminals in the Eastern Time Zone (e.g., satellite terminal 150-e) may receive the advertisement content an hour earlier than those satellite terminals in the Central Time Zone (e.g., satellite terminals 150-a, 150-b, 150-c, and 150-d).

In various examples, devices of a satellite communications system configured for position-based access to the satellite communications system may be configured for subscription costs based on a determined installation position of a satellite terminal 150. For example, in some cases a subscription cost (e.g., a base subscription cost, regional taxes, etc.) may be based at least in part on a country a satellite terminal is located in. Thus, those satellite terminals 150 in the Canada (e.g., satellite terminal 150-c) may have a different subscription cost than those satellite terminals in the United States of America (e.g., satellite terminals 150-a, 150-b, 150-d, and 150-e).

In various examples, devices of a satellite communications system configured for position-based access to the satellite communications system may be configured to balance network traffic and/or other bandwidth economics based on a determined installation position of a satellite terminal. For example, in some cases the first service beam 125 associated with the first service beam coverage area 126-a may be associated with higher network traffic than the second service beam 125 associated with the second service beam coverage area 126-b. Therefore, based on the determined installation position of the satellite terminal 150-d being within both the first service beam coverage area 126-a and the second service beam coverage area 126-b, various devices of the satellite communications system can initiate and/or perform a beam selection and/or reselection for the satellite terminal 150-d to the second service beam 125 associated with the second service beam coverage area 126-b, which may be associated with the same communications satellite 121, or different communications satellites, one of which may be communications satellite 121. Therefore, a satellite communications system may employ position-based access to the satellite communications system, to balance or otherwise redistribute service across various service beams 125.

FIG. 3B provides an illustration 350 of a portion of a map of North America including a first installation position 355 and a second installation position 360 of a satellite terminal 150-f. Satellite terminal 150-f may be configured to receive positioning signals 115, from which the first installation position 355 and the second installation position 360 may each be determined. In various examples, devices of a satellite communications system configured for position-based access to the satellite communications system may initiate a terminal setup procedure based on a difference between the first installation position 355 and the second installation position 360.

For example, devices of a satellite communications system may initiate a terminal setup procedure based on a detected or otherwise identified distance between the first installation position 355 and the second installation position 360 that exceeds a predetermined threshold. In some examples the setup procedure may include an attempt to reestablish a communications link with a communications satellite 121 at the second installation position 360. In some examples the second installation position 360 may be associated with a different geographical region (e.g., a different state), different access rights, different content, different subscription costs, and/or the like. Thus, upon initiating the terminal setup procedure, the satellite terminal 150-e may be denied access to the satellite communications system, may be provided different content, may be blocked from certain content, or may be charged a different subscription cost. For satellite terminals 150 that are intended to be fixed satellite terminals (e.g., as agreed upon in a subscriber agreement), the detection of movement from the first installation position 355 may be used to determine that a satellite terminal has been moved (e.g., to a different installation position, etc.), and changes to a communications service may be made accordingly.

In some examples, devices of the satellite communications may adjust various communications parameters based on the detected or otherwise identified movement of the satellite terminal 150-f from the first installation position 355 to the second installation position 360. For example, signal timing may be adjusted (e.g., adjusting a signal timing offset for transmissions between the satellite terminal 150-f and the communications satellite 121), or RF frequency bands may be reallocated (e.g., selecting a different RF spectrum band for communications between the satellite terminal 150-f and the communications satellite).

In some examples the first installation position 355 may be an approved position for the satellite terminal 150-f (e.g., an approved installation position), and upon exceeding a threshold distance from the approved position, the satellite terminal 150-f may be blocked from the network (e.g., upon determining that that satellite terminal 150-f is being used as a nomadic installation moving between a number of different fixed installation sites or customer premises). In some examples the first installation position 355 may be associated with a first service beam coverage area 126-c, and the second position 360 may be associated with a second service beam coverage area 126-d. The first service beam coverage area 126-c and the second service beam coverage area 126-d may be associated with different service beams 125, which may or may not be associated with the same communications satellite 121. In some examples the setup procedure initiated based on a difference between the first installation position 355 and the second installation position 360 may include a reselection to a service beam 125 and/or communications satellite 121 associated with the second service beam coverage area 126. Thus, a terminal setup procedure may be initiated based on an identified difference between a first installation position and a second installation position of a satellite terminal, and various operations, further described below, may be performed during the initiated setup procedure.

Figure 4A:
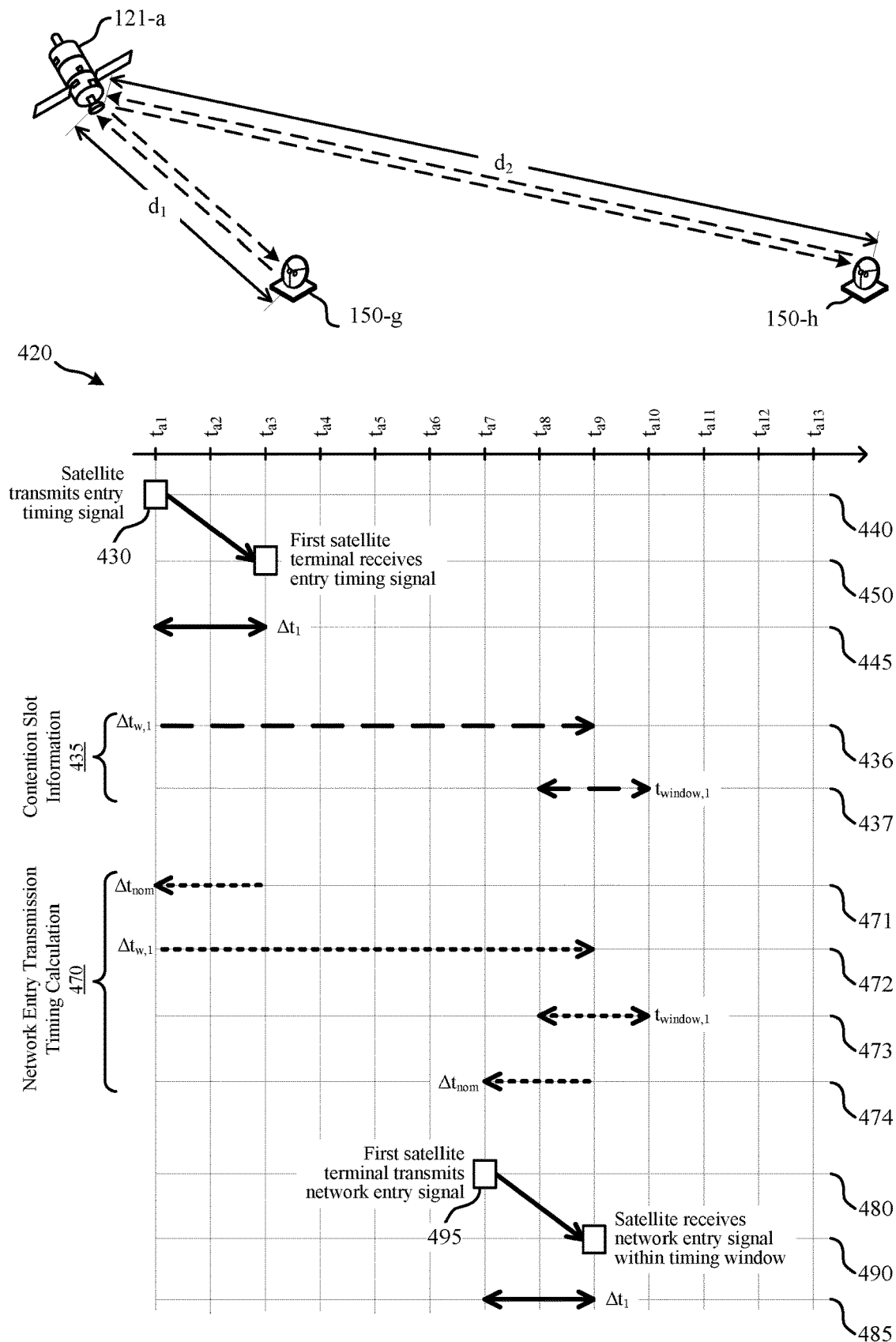
FIGS. 4A and 4B illustrate network entry timing of a satellite communications system for satellite terminals having different distances from a serving communications satellite, and applying a nominal timing offset, in accordance with aspects of the present disclosure.
Figure 4B:
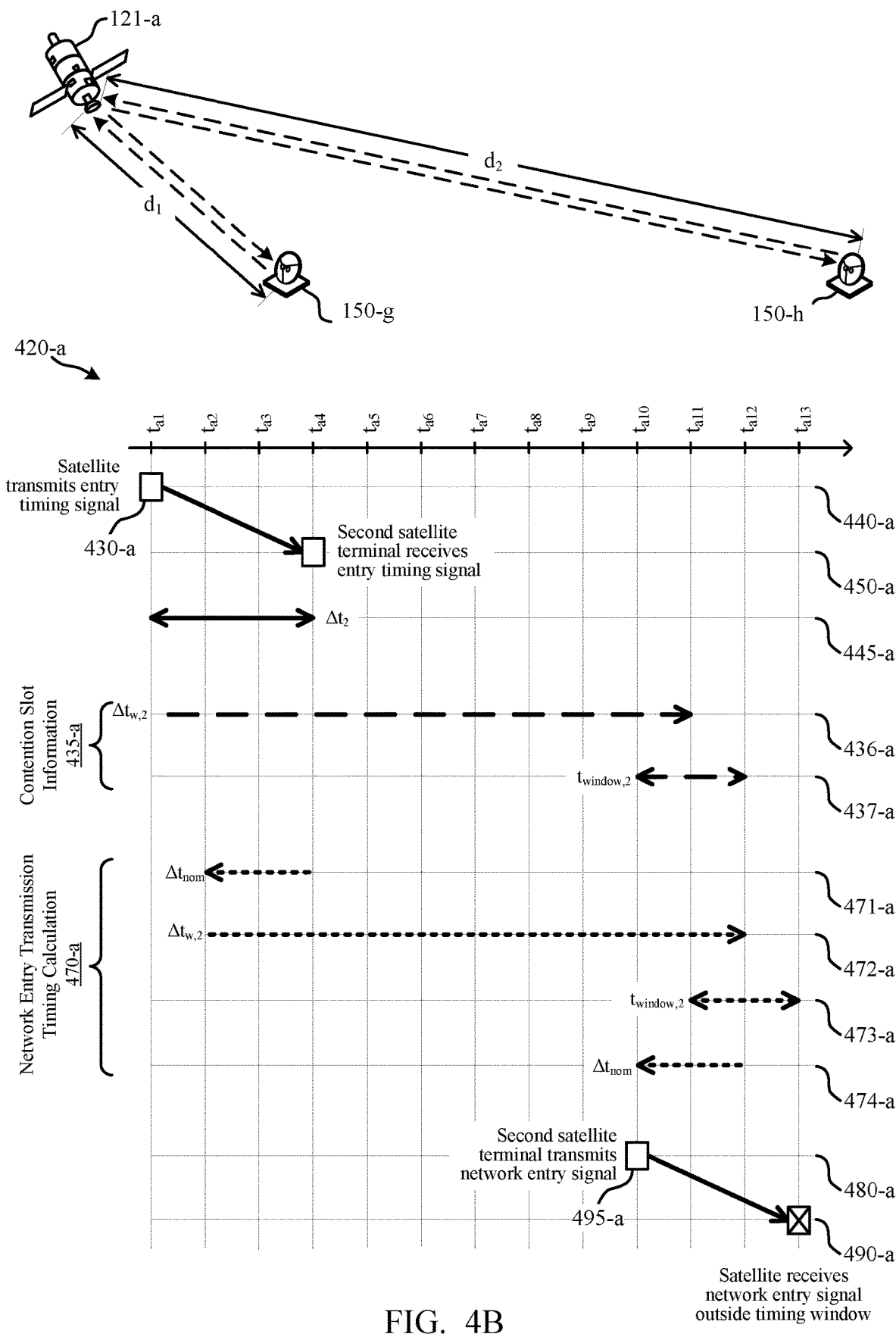

FIGS. 4A and 4B illustrate network entry timing of a satellite communications system-a for satellite terminals 150 having different distances from a serving communications satellite 121-a, and applying a nominal timing offset $\Delta t_{nom}$, in accordance with aspects of the present disclosure. In each of the illustrated examples, the communications satellite 121-a may transmit an entry timing signal 430, which may be an electromagnetic transmission from an antenna of the communications satellite 121-a. The entry timing signal(s) 430 may be transmitted on a forward link carrier, which may be a carrier configured to indicate timing windows (e.g., contention slots) available for satellite terminals to transmit network entry signals to attempt a communications link establishment via the communications satellite 121-a. The entry timing signal(s) 430 may also include other information that may be used to enter a network, such as network configuration parameters, radio frequency spectrum parameters, modulation/demodulation parameters, satellite beam parameters, resource allocations, and the like. The entry timing signal(s) 430 may be received by a first satellite terminal 150-g and/or a second satellite terminal 150-h.

The first satellite terminal 150-g may be separated from the communications satellite 121-a by a first distance (e.g., distance $d_1$, at a first installation position), which results in a propagation delay of $\Delta t_1$ between the transmitting of an entry timing signal 430 from the communications satellite 121-a and the receiving of the signal at the first satellite terminal 150-g. The propagation delay $\Delta t_1$ of the electromagnetic transmission may depend on the various medium through which the transmission is propagating (e.g., atmospheric medium, water, vegetation, buildings, etc.) where each portion of a path may support a particular propagation speed.

The second satellite terminal 150-h may be separated from the communications satellite 121-a by a second distance (e.g., distance $d_2$, at a second installation position), which is longer than distance $d_1$ between the first satellite terminal 150-g and the communications satellite 121-a. The distance $d_2$ may result in a propagation delay of $\Delta t_2$ between the transmitting of an entry timing signal 430 from the communications satellite 121-a and the receiving of the entry timing signal 430 at the second satellite terminal 150-g. The propagation delay $\Delta t_2$, like $\Delta t_1$, of the electromagnetic transmission may depend on the medium through which the transmission is propagating (e.g., atmospheric medium, water, vegetation, buildings, etc.) where each portion of a path may support a particular propagation speed. As illustrated in the present examples, the propagation delay $\Delta t_2$ is longer than the delay $\Delta t_1$, such that an entry timing signal transmitted by the communications satellite 121-a may arrive at the second satellite terminal 150-h later than the signal arrives at the first satellite terminal 150-g.

As illustrated in FIGS. 4A and 4B, the satellite communications system may apply a nominal timing offset $\Delta t_{nom}$ in order to sequence the network entry of each of the first satellite terminal 150-g and the second satellite terminal 150-h. In some examples the nominal timing offset $\Delta t_{nom}$ may be calculated from an average distance between the communications satellite 121-a and various satellite terminals 150 being served by the communications satellite 121-a. For example, the average distance may be the distance between the communications satellite 121-a and a point where the center of a service beam 125 of the communications satellite 121-a is incident on the ground, or some other reference height (e.g., sea level, or an average elevation of a service beam coverage area 126 served by an associated service beam 125). The calculated nominal timing offset $\Delta t_{nom}$ may be applied for all satellite terminals 150 served by the communications satellite 121-a, or multiple timing offsets $\Delta t_{nom}$ may be calculated, and applied to subsets of satellite terminals 150 served by the communications satellite 121-a. For example, each service beam 125 of the communications satellite 121-a may have a respective $\Delta t_{nom}$, and the respective $\Delta t_{nom}$ may be applied to each satellite terminal 150 being served by the respective service beam 125 of the communications satellite 121-a.

FIG. 4A illustrates a network entry timing flow 420 for the first satellite terminal 150-g, where the propagation delay $\Delta t_1$ between the communications satellite 121-a and the first satellite terminal 150-g is equal to the nominal timing offset $\Delta t_{nom}$ for the serving communications satellite 121-a. The network entry timing flow 420 is illustrated with respect to a reference timeline at the satellite, from times $t_{a1}$ to $t_{a13}$.

At step 440 of the network entry timing flow 420, the communications satellite 121-a may transmit an entry timing signal 430 (e.g., at time $t_{a1}$). The entry timing signal 430 may be a portion of a forward link signal 172 transmitted by a service beam 125 of the communications satellite 121-a. At step 450 of the network entry timing flow 420, the first satellite terminal 150-g may receive the entry timing signal 430 (e.g., at time $t_{a2}$). The entry timing signal 430 may be received at a satellite terminal communications antenna 152 of the first satellite terminal 150-g. As illustrated by reference element 445 of the network entry timing flow 420, the receiving of the entry timing signal 430 at the first satellite terminal 150-g in step 450 is delayed from the transmission of the entry timing signal 430 by the communications satellite 121-a in step 440 by the propagation delay $\Delta t_1$ (e.g., the difference between times $t_{a1}$ and $t_{a2}$).

The entry timing signal 430 may include contention slot information 435, which provides information regarding timing that devices (e.g., the communications satellite 121-e, a gateway 130, a network device 141, etc.) of the satellite communications system are expecting network entry signals from various satellite terminals 150, including the first satellite terminal 150-g. For example, as illustrated by reference element 436 of the network entry timing flow 420, the contention slot information 435 may provide timing of a midpoint of a contention slot for the first satellite terminal 150-g, relative to the timing of the transmission of the entry timing signal 430 (e.g., $\Delta t_{w,1}$, representing the difference between times $t_{a1}$ and $t_{a9}$, with $t_{a9}$ being the middle of a contention slot for the first satellite terminal 150-g). As illustrated by reference element 437 of the network entry timing flow 420, the contention slot information 435 may also provide a duration of the contention slot (e.g., $t_{window,1}$, centered at time $t_{a9}$, representing a contention slot for the first satellite terminal 150-g between times $t_{a8}$ and $t_{a10}$). In other examples the contention slot information 435 may omit a duration of a contention slot, which in some examples may alternatively be provided by a predetermined system value. In other examples the contention slot information 435 may include indications of the beginning and end of a contention slot (e.g., an indication of times $t_{a8}$ and $t_{a10}$)

After receiving the entry timing signal 430 at step 450, a network entry transmission timing calculation 470 may be performed for the first satellite terminal 150-g. The network entry transmission timing calculation 470 can be performed to determine a timing for the first satellite terminal 150-g to transmit a network entry signal. For example, the network entry transmission timing calculation 470 may include a step 471, which subtracts the nominal timing offset $\Delta t_{nom}$ from the time that the timing signal was received, approximating the time of transmission from the communications satellite 121-a (e.g., subtracting $\Delta t_{nom}$ from $t_{a3}$ to arrive at $t_{a1}$). Step 471 may be followed by a step 472, which may approximate the midpoint of the contention slot by adding the timing to the midpoint of the contention slot (e.g., $\Delta t_{w,1}$) received in the contention slot information 435 to the approximated satellite transmission timing (e.g., adding $\Delta t_{w,1}$ to $t_{a1}$ to arrive at $t_{a9}$). In some examples, step 472 may be followed by a step 473, which may approximate the boundaries of the contention slot using a contention slot duration (e.g., $\Delta t_{window,1}$ as received in the contention slot information 435, or an otherwise received or predetermined duration) centered at the approximated midpoint of the contention slot. Subsequently, the network entry transmission timing calculation 470 can include a step 474 to calculate a transmission timing by subtracting the nominal timing offset $\Delta t_{nom}$ from the approximated midpoint of the contention slot (e.g., subtracting $\Delta t_{nom}$ from $t_{a9}$ to arrive at a transmission time of $t_{a7}$)

At step 480 of the network entry timing flow 420, after the network entry transmission timing calculation 470 has been completed, the first satellite terminal 150-g may transmit the network entry signal 495 (e.g., at time $t_{a7}$). The network entry signal 495 may be an RF signal transmitted by a communications antenna of the first satellite terminal 150-g, such as an initial ranging burst transmission. In some examples the first satellite terminal 150-g may generate or calculate aspects of the network entry signal based on parameters stored in memory at the first satellite terminal 150-g. For example, the terminal may use the location determined from received positioning signals to select satellite system parameters from memory, such as frequency, timing, or power parameters, which may be associated with a particular spot beam of the communications satellite 121-*a*.

At step 490 of the network entry timing flow 420, the communications satellite 121-*a* may receive the network entry signal 495 (e.g., at time $t_{a9}$). The network entry signal 495 may be received at an antenna of the communications satellite 121-*a*. As illustrated by reference element 485 of the network entry timing flow 420, the receiving of the network entry signal 495 at the communications satellite 121-*a* in step 490 is delayed from the transmission of the network entry signal 495 by the first terminal in step 480, again by the propagation delay $\Delta t_1$ (e.g., the difference between times $t_{a7}$ and $t_{a9}$).

As illustrated in the present example of FIG. 4A, because the nominal timing offset $\Delta t_{nom}$ is equal to the propagation delay $\Delta t_1$ between the communications satellite 121-*a* and the first satellite terminal 150-*g*, the network entry signal 495 arrives at the communications satellite 121-*a* within the contention slot (e.g., the timing window between the times $t_{a8}$ and $t_{a10}$ as included, for example, in the contention slot information 435). Thus, a network entry procedure between the first satellite terminal 150-*g* and the communications satellite 121-*a* (or associated gateway 130 or network device 141) may proceed accordingly.

FIG. 4B illustrates a network entry timing flow 420-*a* for the second satellite terminal 150-*h*, where the propagation delay $\Delta t_2$ between the communications satellite 121-*a* and the second satellite terminal 150-*h* is greater than the nominal timing offset $\Delta t_{nom}$ for the serving communications satellite 121-*a*. The network entry timing flow 420-*a* is again illustrated with respect to a reference timeline at the communications satellite 121-*a*, from times $t_{a1}$ to $t_{a13}$.

At step 440-*a* of the network entry timing flow 420-*a*, the communications satellite 121-*a* may transmit an entry timing signal 430-*a* (e.g., at time $t_{a1}$). In various examples the entry timing signal 430-*a* may be the same as the entry timing signal 430 described with reference to FIG. 4A, or may be an independent transmission from the communications satellite 121-*a*. At step 450-*a* of the network entry timing flow 420-*a*, the second satellite terminal 150-*h* may receive the entry timing signal 430-*a* (e.g., at time $t_{a3}$). As illustrated by reference element 445-*a* of the network entry timing flow 420-*a*, the receiving of the entry timing signal 430-*a* at the second satellite terminal 150-*h* in step 450-*a* is delayed from the transmission of the entry timing signal 430-*a* by the communications satellite 121-*a* in step 440-*a* by the propagation delay $\Delta t_2$ (e.g., the difference between times $t_{a1}$ and $t_{a3}$).

The entry timing signal 430-*a* may include contention slot information 435-*a*, which provides information regarding timing that devices (e.g., the communications satellite 121-*a*, a gateway 130, a network device 141, etc.) of the satellite communications system are expecting network entry signals from various satellite terminals 150, including the second satellite terminal 150-*h*. For example, as illustrated by reference element 436-*a* of the network entry timing flow 420-*a*, the contention slot information 435-*a* may provide timing of a midpoint of a contention slot for the second satellite terminal 150-*h*, relative to the timing of the transmission of the entry timing signal 430-*a* (e.g., $\Delta t_{w,2}$, representing the difference between times $t_{a1}$ and $t_{a11}$, with $t_{a11}$ being the middle of a contention slot for the second satellite terminal 150-*h*). As illustrated by reference element 437-*a* of the network entry timing flow 420-*a*, the contention slot information 435-*a* may also provide a duration of the contention slot (e.g., $t_{window,2}$, centered at time $t_{a11}$, representing the contention slot for the second satellite terminal 150-*h* between times $t_{a10}$ and $t_{a12}$). As illustrated by FIGS. 4A and 4B, the contention slots for various satellite terminals 150 may be different, and non-overlapping (e.g., the contention slot for the first satellite terminal 150-*g* being between times $t_{a8}$ and $t_{a10}$, and the contention slot for the second satellite terminal 150-*h* being between times $t_{a10}$ and $t_{a12}$). In other examples, contention slots for various satellite terminals 150 of a satellite communications system may have the same or different durations, may have the same or different boundaries, and may be overlapping, coincident, or separated by some amount of time (e.g., separated by a guard band).

After receiving the entry timing signal 430-*a* at step 450-*a*, a network entry transmission timing calculation 470-*a* may be performed for the second satellite terminal 150-*h*. The network entry transmission timing calculation 470-*a* can be performed to determine a timing for the second satellite terminal 150-*h* to transmit a network entry signal. For example, the network entry transmission timing calculation 470-*a* may include a step 471-*a*, which subtracts the nominal timing offset $\Delta t_{nom}$ from the time that the timing signal was received, approximating the time of transmission from the communications satellite 121-*e* (e.g., subtracting $\Delta t_{nom}$ from $t_{a4}$ to arrive at $t_{a2}$).

In the example of FIG. 4B, because the propagation delay $\Delta t_2$ between the communications satellite 121-*a* and the second satellite terminal 150-*h* is greater than the nominal timing offset $\Delta t_{nom}$ for the serving communications satellite 121-*a*, the estimate of the timing signal transmission time is later than the actual transmission time from the communications satellite 121-*a* (e.g., an estimated transmission time of $t_{a2}$, compared to an actual transmission time of $t_{a1}$). Step 471-*a* may be followed by a step 472-*a*, which approximates the midpoint of the contention slot by adding the timing to the midpoint of the contention slot (e.g., $\Delta t_{w,2}$) received in the contention slot information 435 to the approximated satellite transmission timing (e.g., adding $\Delta t_{w,2}$ to $t_{a2}$ to arrive at $t_{a11}$). In some examples, step 472-*a* may be followed by a step 473-*a*, which may approximate the boundaries of contention slot using a contention slot duration (e.g., $t_{window,2}$ as received in the contention slot information 435, or an otherwise received or predetermined duration) centered at the approximated midpoint of the contention slot. In the example of FIG. 4B, because the propagation delay $\Delta t_2$ is greater than the nominal timing offset $\Delta t_{nom}$, the estimates of the middle and/or boundaries of the contention slot are later than the actual middle and/or boundaries of the contention slot from the perspective of the communications satellite 121-*a* (e.g., an estimated contention slot between times $t_{a1}$ to $t_{a13}$, compared to an actual contention slot between times $t_{a10}$ through $t_{a12}$). Subsequently, the network entry transmission timing calculation 470-*a* can include a step 474-*a* to calculate a transmission timing by subtracting the nominal timing offset $\Delta t_{nom}$ from the approximated midpoint of the contention slot (e.g., subtracting $\Delta t_{nom}$ from $t_{a12}$ to arrive at a transmission time of $t_{a10}$)

At step 480-*a* of the network entry timing flow 420-*a*, after the network entry transmission timing calculation 470-*a* has been completed, the second satellite terminal 150-*h* may transmit the network entry signal 495-*a* (e.g., at time $t_{a10}$). At step 490-*a* of the network entry timing flow 420-*a*, the communications satellite 121-*a* may receive the network entry signal 495-*a* (e.g., at time $t_{a13}$).

As illustrated in the present example of FIG. 4B, because the propagation delay $\Delta t_2$ between the communications satellite 121-*a* and the second satellite terminal 150-*h* is greater than the nominal timing offset $\Delta t_{nom}$ for the serving communications satellite 121-*a*, the network entry signal 495-*a* arrives at the communications satellite 121-*a* after the time of arrival estimated by the network entry transmission timing calculation 470-*a* (e.g., received at the communications satellite at time $t_{a13}$, compared to an estimated time of arrival of time $t_{a12}$ calculated at step 472-*a*). Furthermore, the network entry signal is received by the communications satellite 121-*a* outside the contention slot (e.g., outside the timing window between the times $t_{a10}$ and $t_{a12}$ as included in the contention slot information 435-*a*). Thus, a network entry procedure between the second satellite terminal 150-*h* and the communications satellite 121-*a* (or associated gateway 130 or network device 141) may be unsuccessful if a propagation delay between a communications satellite 121 and a satellite terminal 150 is different than a nominal timing offset.

Although a longer contention slot periods may be defined for the satellite communications system (e.g., including a longer uncertainty window, a longer guard period, etc.), the longer contention slots may be an inefficient use of radio frequency spectrum resources and/or lead to greater latency in the satellite communications system. For example, the longer contention slots may reduce the number of contention slots that can be accommodated in a given period of time, and therefore may delay network entry for some satellite terminals. Furthermore, timing uncertainties associated with satellite terminals 150 being located at various unknown or coarsely known positions in a service beam 125 may require relatively numerous decoder iterations and timing hypotheses, increasing complexity and/or processing at a gateway 130 that may be processing signals for network entry. Thus, improvements to network entry procedures can be made by using more precise installation locations as determined by positioning signals received at a satellite terminal 150. For example, the more precise installation locations may reduce the timing uncertainty window and/or reduce the guard time.

Figure 5A:
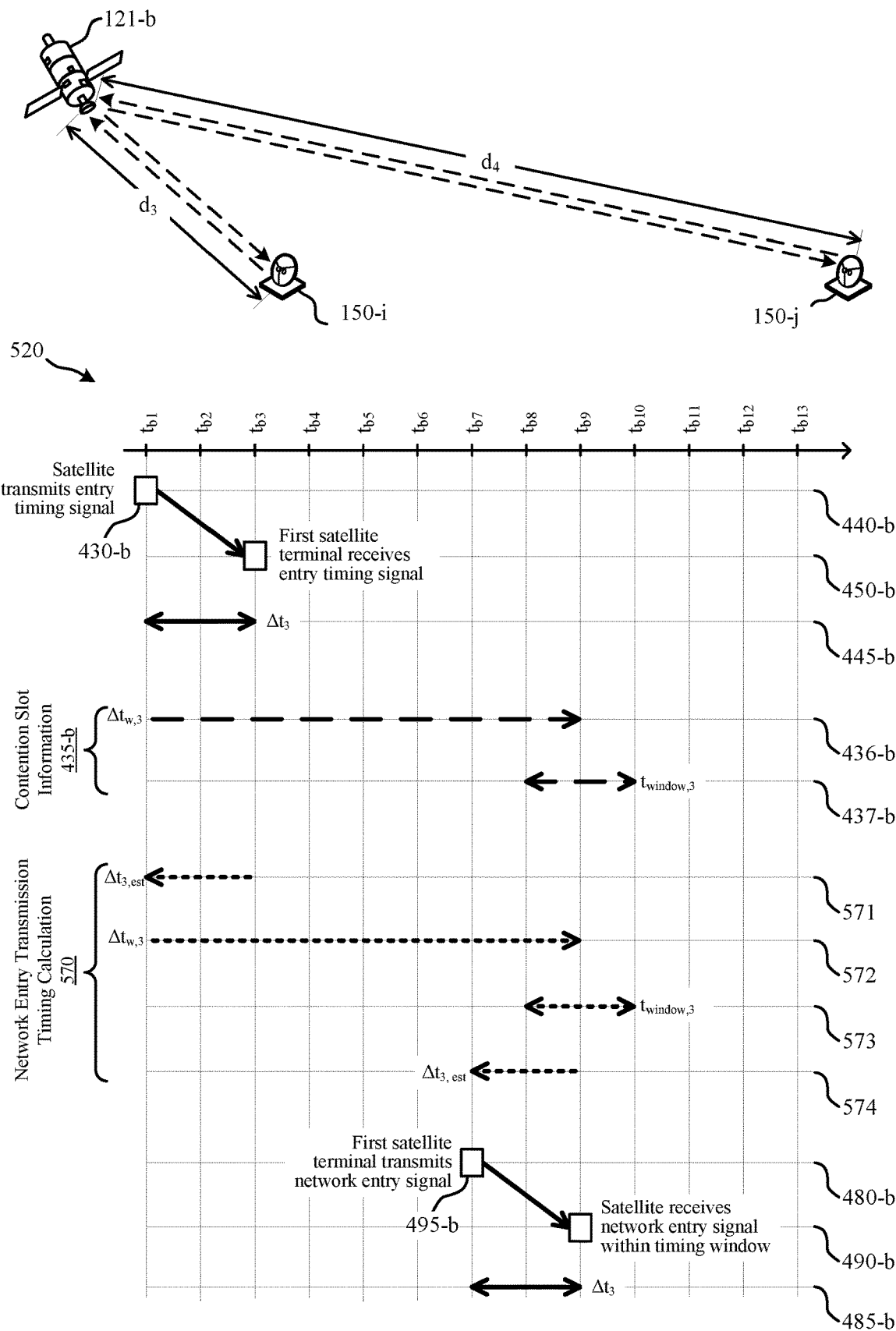
FIGS. 5A and 5B illustrate network entry timing of a satellite communications system for satellite terminals having different distances from a serving communications satellite, where the satellite terminals are configured for position-based access, in accordance with aspects of the present disclosure.
Figure 5B:
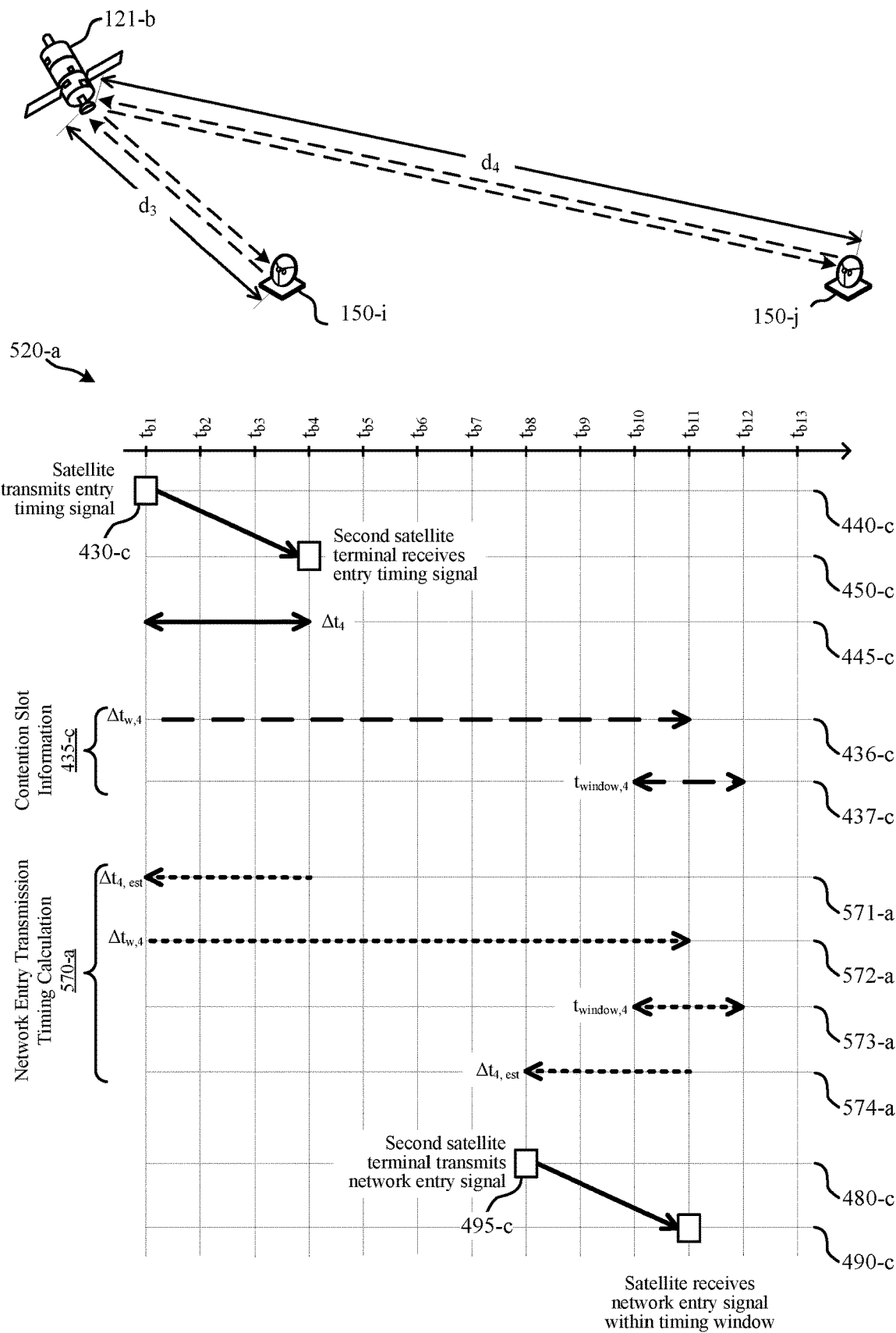

FIGS. 5A and 5B illustrate network entry timing of a satellite communications system for satellite terminals 150 having different distances from a serving communications satellite, where the satellite terminals are configured for position-based access, in accordance with aspects of the present disclosure. In each of the illustrated examples, a communications satellite 121-*b* may transmit an entry timing signal 430. The entry timing signal 430 may be received by a first satellite terminal 150-*i* and/or a second satellite terminal 150-*j*, and may include information regarding contention slots for the first satellite terminal 150-*i* and/or the second satellite terminal 150-*j* to attempt entry into a satellite communications network. The entry timing signal(s) 430 may also include other information that may be used to enter a network, such as network configuration parameters, radio frequency spectrum parameters, modulation/demodulation parameters, satellite beam parameters, resource allocations, and the like.

The first satellite terminal 150-*i* may be separated from the communications satellite 121-*b* by a first distance (e.g., distance $d_3$, at a first installation position), which results in a propagation delay of $\Delta t_3$ between the transmitting of an entry timing signal 430 from the communications satellite 121-*a* and the receiving of the signal at the first satellite terminal 150-*i*. The propagation delay $\Delta t_3$ may be the result of the signal propagating through various medium (e.g., atmospheric medium, water, vegetation, buildings, etc.) where each portion of a path may support a particular propagation speed.

The second satellite terminal 150-*j* may be separated from the communications satellite 121-*b* by a second distance (e.g., distance $d_4$, at a second installation position), which is longer than distance $d_3$ between the first satellite terminal 150-*i* and the communications satellite 121-*b*. The distance $d_4$ may result in a propagation delay of $\Delta t_4$ between the transmitting of an entry timing signal 430 from the communications satellite 121-*a* and the receiving of the entry timing signal 430 at the second satellite terminal 150-*i*. As illustrated in the present examples, the propagation delay $\Delta t_4$ is longer than the propagation delay $\Delta t_3$, such that an entry timing signal 430 transmitted by the communications satellite 121-*a* may arrive at the second satellite terminal 150-*j* later than the same entry timing signal 430 arrives at the first satellite terminal 150-*i*.

As illustrated in FIGS. 5A and 5B, the satellite communications system may apply different timing offsets for each of the satellite terminals 150 being served by the communications satellite 121-*b*. Specifically, devices of the satellite communications system can employ a timing offset $\Delta t_{3,est}$ to sequence the network entry of the first satellite terminal 150-*i*, and a timing offset $\Delta t_{4,est}$ to sequence the network entry of the second satellite terminal 150-*j*. The timing offsets $\Delta t_{3,est}$ and $\Delta t_{4,est}$ can be an approximations of the propagation delays $\Delta t_3$ and $\Delta t_4$, respectively.

According to aspects of the present disclosure, the timing offsets $\Delta t_{3,est}$ and $\Delta t_{4,est}$ may be based on positions determined from positioning signals 115 received at the first satellite terminal 150-*i* and the second satellite terminal 150-*j*, respectively. For example, the first satellite terminal 150-*i* may receive one or more positioning signals to determine its own position, and the distance between the determined position of the first satellite terminal 150-*i* and a position of the communications satellite 121-*b* may be estimated by various devices of the satellite communications system. In various examples the position of the communications satellite 121-*b* may be determined from a signal transmitted by the communications satellite 121-*b*, from a predetermined value or lookup table at the first satellite terminal 150-*i*, or from information received from another device of the satellite communications system (e.g., a CPE 160, a gateway 130, and/or a network device 141). The timing offset $\Delta t_{3,est}$ can be estimated by applying assumed propagation constants (e.g., assumed permeability, permittivity, propagation speed, etc.) along with the estimated distance between the first satellite terminal 150-*i* and the communications satellite 121-*b* by way of various calculations, which may be carried out by any of the first satellite terminal 150-*i*, a CPE 160, a gateway 130, and/or a network device 141. In various examples, the timing offset $\Delta t_{4,est}$ may be determined for the second satellite terminal 150-*j* accordingly.

FIG. 5A illustrates a network entry timing flow 520 for the first satellite terminal 150-*i*, where the propagation delay $\Delta t_3$ between the communications satellite 121-*b* and the first satellite terminal 150-*i* is approximated by the timing offset $\Delta t_{3,est}$. The network entry timing flow 520 is illustrated with respect to a reference timeline at the communications satellite 121-*b*, from times $t_{b1}$ to $t_{b13}$.

At step 440-*b* of the network entry timing flow 520, the communications satellite 121-*b* may transmit an entry timing signal 430-*b* (e.g., at time $t_{b1}$). The entry timing signal 430-*b* may be a portion of a forward link signal 172 transmitted by a service beam 125 of the communications satellite 121-b. At step 450-b of the network entry timing flow 520, the first satellite terminal 150-i may receive the entry timing signal 430-b (e.g., at time $t_{b3}$). The entry timing signal 430-b may be received, for example, at a satellite terminal communications antenna 152 of the first satellite terminal 150-i. As illustrated by reference element 445-b of the network entry timing flow 520, the receiving of the entry timing signal 430-b at the first satellite terminal 150-i in step 450-b is delayed from the transmission of the entry timing signal 430-b by the communications satellite 121-b in step 440-b by the propagation delay $\Delta t_3$ (e.g., the difference between times $t_{b1}$ and $t_{b3}$).

The entry timing signal 430-b may include contention slot information 435-b, which provides information regarding timing that devices (e.g., the communications satellite 121-b, a gateway 130, a network device 141, etc.) of the satellite communications system that are expecting network entry signals from various satellite terminals 150, including the first satellite terminal 150-i. For example, as illustrated by reference element 436-b of the network entry timing flow 520, the contention slot information 435-b may provide timing of a midpoint of a contention slot for the first satellite terminal 150-i, relative to the timing of the transmission of the entry timing signal 430-b (e.g., $\Delta t_{w,3}$, representing the difference between times $t_{b1}$ and $t_{b9}$, with $t_{b9}$ being the middle of the contention slot for the first satellite terminal 150-i). As illustrated by reference element 437-b of the network entry timing flow 520, the contention slot information 435-b may also provide a duration of the contention slot (e.g., $t_{window,3}$, centered at time $t_{b9}$, representing a contention slot for the first satellite terminal 150-i between times $t_{b8}$ and $t_{b10}$). In other examples the contention slot information 435-b may omit a duration of the contention slot, which in some examples may be provided by a predetermined system value. In other examples the contention slot information 435-b may include indications of the beginning and end of a contention slot (e.g., an indication of times $t_{b8}$ and $t_{b10}$)

After receiving the entry timing signal 430-b at step 450-b, a network entry transmission timing calculation 570 may be performed for the first satellite terminal 150-i. The network entry transmission timing calculation 570 can be performed to determine a timing for the first satellite terminal 150-i to transmit a network entry signal. For example, the network entry transmission timing calculation 570 may include a step 571, which subtracts the timing offset $\Delta t_{3,est}$ from the time that the timing signal was received, approximating the time of transmission from the communications satellite 121-g (e.g., subtracting $\Delta t_{3,est}$ from $t_{b3}$ to arrive at $t_{b1}$). Step 571 may be followed by a step 572, which may approximate the midpoint of the contention slot by adding the timing to the midpoint of the contention slot (e.g., $\Delta t_{w,3}$) received in the contention slot information 435-b to the approximated satellite transmission timing (e.g., adding $\Delta t_{w,3}$ to $t_{b1}$ to arrive at $t_{b9}$). In some examples, step 572 may be followed by a step 573, which may approximate the boundaries of the contention slot using a contention slot duration (e.g., $t_{window,3}$ as received in the contention slot information 435-b, or an otherwise received or predetermined duration) centered at the approximated midpoint of the contention slot. Subsequently, the network entry transmission timing calculation 570 can include a step 574 to calculate a transmission timing by subtracting the timing offset $\Delta t_{3,est}$ from the approximated midpoint of the contention slot (e.g., subtracting $\Delta t_{3,est}$ from $t_{b9}$ to arrive at a transmission time of $t_{b7}$).

At step 480-b of the network entry timing flow 520, after the network entry transmission timing calculation 570 has been completed, the first satellite terminal 150-i may transmit the network entry signal 495-b (e.g., at time $t_{b7}$). The network entry signal 495-b may be a portion of a return link signal 173 transmitted by a satellite terminal communications antenna 152 of the first satellite terminal 150-i, such as an initial ranging burst transmission. At step 490-b of the network entry timing flow 420-b, the communications satellite 121-b may receive the network entry signal 495-b (e.g., at time $t_{b9}$). As illustrated by reference element 485-b of the network entry timing flow 420-b, the receiving of the network entry signal 495-b at the communications satellite 121-b in step 490-b is delayed from the transmission of the network entry signal 495-b by the first satellite terminal in step 480-b, again by the propagation delay $\Delta t_3$ (e.g., the difference between times $t_{b7}$ and $t_{b9}$).

As illustrated in the present example of FIG. 5A, because the timing offset $\Delta t_{3,est}$ is equal to the propagation delay $\Delta t_3$ between the communications satellite 121-b and the first satellite terminal 150-i, the network entry signal 495-b arrives at the communications satellite 121-b within the contention slot for the first satellite terminal 150-i (e.g., the contention slot between the times $t_{a8}$ and $t_{a10}$ as included, for example, in the contention slot information 435-b). Thus, a network entry procedure between the first satellite terminal 150-i and the communications satellite 121-b (or associated gateway 130 and/or other network device(s) 141) may proceed accordingly.

FIG. 5B illustrates a network entry timing flow 520-a for the second satellite terminal 150-j, where the propagation delay $\Delta t_4$ between the communications satellite 121-b and the second satellite terminal 150-h is approximated by timing offset $\Delta t_{4,est}$. The network entry timing flow 520-a is again illustrated with respect to a reference timeline at the communications satellite 121-b, from times $t_{b1}$ to $t_{b13}$.

At step 440-c of the network entry timing flow 420-c, the communications satellite 121-b may transmit an entry timing signal 430-c (e.g., at time $t_{b1}$). In various examples the entry timing signal 430-c may be the same as the entry timing signal 430-b described with reference to FIG. 5A, or may be an independent transmission from the communications satellite 121-b. At step 450-c of the network entry timing flow 520-a, the second satellite terminal 150-j may receive the entry timing signal 430-c (e.g., at time $t_{b4}$). As illustrated by reference element 445-c of the network entry timing flow 520-a, the receiving of the entry timing signal 430-c at the second satellite terminal 150-j in step 450-c is delayed from the transmission of the entry timing signal 430-c by the communications satellite 121-b in step 440-c by the propagation delay $\Delta t_4$ (e.g., the difference between times $t_{b1}$ and $t_{b4}$).

The entry timing signal 430-c may include contention slot information 435-c, which provides information regarding timing that devices (e.g., the communications satellite 121-b, a gateway 130, a network device 141, etc.) of the satellite communications system are expecting network entry signals from various satellite terminals 150, including the second satellite terminal 150-j. For example, as illustrated by reference element 436-c of the network entry timing flow 520-a, the contention slot information 435-c may provide timing of a midpoint of a contention slot for the second satellite terminal 150-j, relative to the timing of the transmission of the entry timing signal 430-c (e.g., $\Delta t_{w,4}$, representing the difference between times $t_{b1}$ and $t_{b11}$, with $t_{b11}$ being the middle of the contention slot for the second satellite terminal 150-j). As illustrated by reference element 437-c of the network entry timing flow 520-a, the contention slot information 435-c may also provide a duration of the contention slot (e.g., $t_{window,4}$, centered at time $t_{b11}$, representing the contention slot for the second satellite terminal 150-$j$ between times $t_{b10}$ and $t_{b12}$).

As illustrated by FIGS. 5A and 5B, the contention slots for various satellite terminals 150 may again be different, and non-overlapping (e.g., the contention slot for the first satellite terminal 150-$i$ being between times $t_{b8}$ and $t_{b10}$, and the contention slot for the second satellite terminal 150-$j$ being between times $t_{b10}$ and $t_{b12}$). In other examples, contention slots for various satellite terminals 150 of the satellite communications system may have the same or different durations, may have the same or different boundaries, and may be overlapping, coincident, or separated by some amount of time (e.g., separated by a guard period).

After receiving the entry timing signal 430-$c$ at step 450-$c$, a network entry transmission timing calculation 570-$a$ may be performed for the second satellite terminal 150-$j$. The network entry transmission timing calculation 570-$a$ can be performed to determine a timing for the second satellite terminal 150-$j$ to transmit a network entry signal. For example, the network entry transmission timing calculation 570-$a$ may include a step 571-$a$, which subtracts the timing offset $\Delta t_{4,est}$ from the time that the timing signal was received, approximating the time of transmission from the communications satellite 121-$b$ (e.g., subtracting $\Delta t_{4,est}$ from $t_{b4}$ to arrive at $t_{b1}$). In the example of FIG. 5B, because the propagation delay $\Delta t_4$ between the communications satellite 121-$a$ and the second satellite terminal 150-$j$ is equal to the timing offset $\Delta t_{4,est}$, the estimate of the timing signal transmission time is the same as the actual transmission time from the satellite (e.g., $t_{b1}$). Step 571-$a$ may be followed by a step 572-$a$, which approximates the midpoint of the contention slot by adding the timing to the midpoint of the contention slot (e.g., $\Delta t_{w,4}$) received in the contention slot information 435-$c$ to the approximated satellite transmission timing (e.g., adding $\Delta t_{w,4}$ to $t_{b1}$ to arrive at $t_{b11}$). In some examples, step 572-$a$ may be followed by a step 573-$a$, which may approximate the boundaries of the contention slot using a contention slot duration (e.g., $t_{window,4}$ as received in the contention slot information 435-$c$, or an otherwise received or predetermined duration) centered at the approximated midpoint of the contention slot.

In the example of FIG. 5B, because the propagation delay $\Delta t_4$ is equal to the timing offset $\Delta t_{4,est}$, the estimates of the middle and/or boundaries of the contention slot are equal to the actual middle and/or boundaries of the contention slot from the perspective of the communications satellite 121-$b$ (e.g., an estimated contention slot of times $t_{b11}$ to $t_{b13}$, equal to the actual contention slot). Subsequently, the network entry transmission timing calculation 570-$a$ can include a step 574-$a$ to calculate a transmission timing by subtracting the timing offset $\Delta t_{4,est}$ from the approximated midpoint of the contention slot (e.g., subtracting $\Delta t_{4,est}$ from $t_{b11}$ to arrive at a transmission time of $t_{b8}$)

At step 480-$c$ of the network entry timing flow 520-$a$, after the network entry transmission timing calculation 570-$a$ has been completed, the second satellite terminal 150-$j$ may transmit the network entry signal 495-$c$ (e.g., at time $t_{b8}$). At step 490-$c$ of the network entry timing flow 520-$a$, the communications satellite 121-$b$ may receive the network entry signal 495-$c$ (e.g., at time $t_{b11}$).

As illustrated in the present example of FIG. 5B, because the propagation delay $\Delta t_4$ between the communications satellite 121-$b$ and the second satellite terminal 150-$j$ is equal to the timing offset $\Delta t_{4,est}$, the network entry signal 495-$c$ also arrives at the communications satellite 121-$b$ within the contention slot for the second satellite terminal 150-$j$ (e.g., within the contention slot between the times $t_{b10}$ and $t_{b12}$ as included in the contention slot information 435-$c$). Thus, a network entry procedure between the first satellite terminal 150-$i$ and the communications satellite 121-$b$ and a network entry procedure between the second satellite terminal 150-$j$ and the communications satellite 121-$b$ (or associated gateway 130, and/or network devices 141) may both be successful, despite different distances $d_3$ and $d_4$.

The success of the network entry procedures may be due, at least in part, to the estimation of distances $d_3$ and $d_4$ in order to calculate timing for the transmission of network entry signals. As described herein, such estimations may employ installation positions of the first satellite terminal 150-$i$ and the second satellite terminal 150-$j$ as determined based on positioning signals 115 received at the first satellite terminal 150-$i$ and the second satellite terminal 150-$j$, respectively. By improving the estimates of signal propagation delays in this manner, a satellite communications system may use radio frequency spectrum resources more efficiently and/or reduce latency in the satellite communications system. For example, by reducing signal timing uncertainty, a number of contention slots that can be accommodated in a given period of time may be increased, which may reduce network entry delays for some satellite terminals. Furthermore, reducing timing uncertainties associated with satellite terminals 150 being installed at various unknown or coarsely known installation positions may reduce a number of decoder iterations and timing hypotheses, reducing complexity and/or processing at a gateway 130 that may be processing signals for network entry. Reduced complexity and/or processing at gateway 130 may free up resources at gateway 130 for other purposes that further improve system performance (e.g., for processing data transmissions, improving network entry efficiency, etc.). In some examples, several contention processes may be used, including a coarse timing and a fine timing contention process. Reducing timing uncertainty may also allow for the elimination of a coarse timing contention process, such that fine timing may begin more quickly.

Although the descriptions of FIGS. 4A, 4B, 5A, and 5B relate to communications between a communications satellite 121 and satellite terminals 150 at various installation positions, the described methods are equally applicable to communications between a communications satellite 121 and an associated gateway 130. For example, determined positions of a communications satellite 121 and an associated gateway 130 may be used to approximate a propagation delay between the communications satellite 121 and the associated gateway 130. The approximation may be used to determine a signal timing offset, which may be applied to subsequent communications between the communications satellite and the associated gateway. The approximation may be adjusted over time based on communications signals between the communications satellite 121 and the gateway 130, and/or based on changes to the respective determined positions (e.g., determined movement of the communications satellite 121 and/or the associated gateway 130).

In some examples, a communications satellite 121 may forward signals between a gateway 130 and various satellite terminals 150 served by the gateway 130. In such examples communications may be synchronized (e.g., managed, controlled, etc.) between the gateway 130 and the satellite terminals 150. In other words, in some examples the communications satellite 121 may not perform a role in synchronizing communications between the gateway 130 and the satellite terminals 150 being served by the gateway. In such examples, a reference timeline for providing synchronization calculations, such as those previously described with reference to FIG. 4A, 4B, 5A, or 5B, may be based on time at the gateway 130, rather than a reference timeline based on time at a communications satellite 121 as described with reference to FIGS. 4A, 4B, 5A, and 5B. Furthermore, a propagation delay in such examples may include, for example, a propagation delay for the signals between the gateway 130 and the communications satellite 121, a propagation delay for signals between the communications satellite 121 and a satellite terminal 150, and signal processing delays that may occur at the communications satellite 121 (e.g., filtering, multiplexing/demultiplexing, etc.).

Various contributions to each of the components of the propagation delay may be predetermined or measured, and applied according to approximations of a propagation delay for each satellite terminal. For example, a gateway signal timing offset associated with communications between a gateway 130 and a communications satellite 121 may be measured or estimated, and subsequently stored and/or updated over time. The gateway signal timing offset may be applied in signal timing calculations for a plurality of satellite terminals served by the associated gateway 130, such as being added to a signal timing offset determined by a network entry transmission timing calculation 570 as described with reference to FIG. 5A or 5B. Similarly, an estimate of a signal processing delay at the communications satellite 121 may be added to a signal timing offset. Thus, various methods may be applied to estimate a propagation delay between a satellite terminal 150 and a gateway 130, to improve synchronization between the satellite terminal 150 and the gateway 130 for procedures such as a network entry procedure and/or terminal setup procedure.

In some examples a satellite terminal 150 may temporarily lack a receiving of positioning signals, which may be a result of positioning signals not being transmitted, attenuation between the positioning signal transmitter and the satellite terminal, receiver failure at the satellite terminal (e.g., failure at an auxiliary antenna 151, etc.), and the like. In such examples, a satellite terminal may rely on other methods of determining a signal timing offset and or a transmission timing to send a network entry signal. For example, the satellite terminal may rely on a nominal signal timing offset, which may be based on an average distance and/or average timing offset for installation positions associated with a service beam 125 of a communications satellite 121. In some examples a satellite terminal 150 may have memory (e.g., at a satellite terminal antenna assembly 155, a satellite terminal receiver 154, etc.) which may store one or more last-known-good (LKG) values for a signal timing offset, an installation position of the satellite terminal 150, position of the communications satellite 121, and/or distance between the satellite terminal 150 and a communications satellite 121. The LKG values may be based on parameters from a previously successful establishment of communications between the satellite terminal 150 and the communications satellite 121 for a particular installation position of the satellite terminal 150, which may have been based at least in part on received positioning signals, and any subsequent signal timing adjustments made after communications were initially established.

Although the network entry timing flows 420 and 520 of FIGS. 4A, 4B, 5A, and 5B show uniform spacing between each time interval (e.g., the time between $t_{a1}$ and $t_{a2}$ is shown as equal to the time between $t_{a2}$ and $t_{a3}$), the timelines are shown for illustrative purposes only, and are not shown to scale. Any of the time intervals illustrated by the network entry timing flows 420 and 520 may be shorter or longer while still pertaining to the features described according to the scope of the present disclosure.

Figure 6:
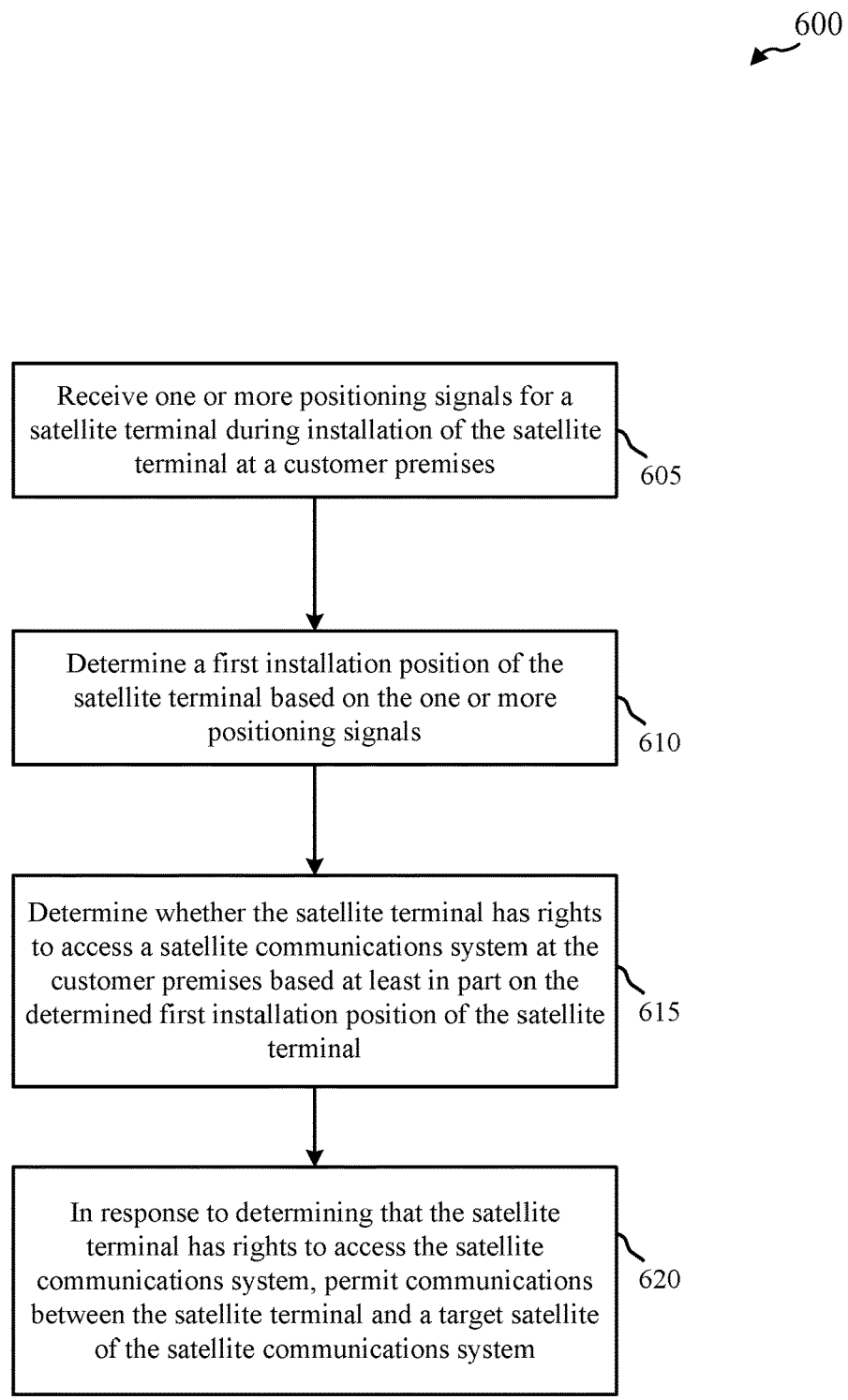
FIGS. 6 through 8 show flowcharts illustrating exemplary methods for position-based access to a satellite communications system, in accordance with aspects of the present disclosure.

FIG. 6 shows a flowchart illustrating an exemplary method 600 for position-based access to a satellite communications system, in accordance with aspects of the present disclosure. The steps of the exemplary method 600 may be performed by various devices of a satellite communication environment, including a satellite terminal 150 having a satellite terminal communications antenna 152 and a satellite terminal auxiliary antenna 151, which in some examples may be coupled to each other in a satellite terminal antenna assembly 155. A satellite terminal 150 associated with the exemplary method 600 may be configured for communications with a communications satellite, which may be an example of aspects of one or more communications satellite(s) 121 of a satellite communications system, as described with reference to FIGS. 1 through 5. A satellite terminal 150 associated with the exemplary method 600 may also be configured to receive positioning signals 115 via the satellite terminal auxiliary antenna as described with reference to FIGS. 1 through 5.

At step 605, the exemplary method 600 may include receiving one or more positioning signals for a satellite terminal 150 during installation of the satellite terminal at a customer premises. In some examples a single ranging signal may be received at the satellite terminal 150, where an installation position is determined from a determined distance from a transmitting device and an orientation between the transmitting device and the satellite terminal. In some examples a plurality of positioning signals may be received, and an installation position may be determined from a triangulation calculation. For example, a satellite terminal may be configured to receive a plurality of positioning signals from a GNSS constellation (e.g., a GPS constellation, a GLONASS constellation, etc.), where the signals received from the GNSS constellation are suitable for determining the installation position of the satellite terminal 150.

At step 610, the exemplary method 600 may include determining a first installation position of the satellite terminal 150 based on the one or more positioning signals 115. In some examples determining the first installation position may be performed by the satellite terminal 150 that has received the positioning signals 115. In other examples at least a portion of the positioning signals 115 may be forwarded by the receiving satellite terminal 150 to another device of the satellite communications environment, such as a CPE 160, a gateway 130, or a network device 141 which subsequently determines the installation position of the satellite terminal 150 based at least in part on the forwarded positioning signals 115.

At step 615, the exemplary method 600 may include determining whether the satellite terminal 150 has rights to access a satellite communications system at the customer premises based at least in part on the determined first installation position of the satellite terminal 150. For example, a comparison may be made between a predetermined installation position for the satellite terminal 150 (e.g., an installation position where the satellite terminal 150 was initially installed, an approved installation position for the satellite terminal, etc.) and the determined first installation position. In some examples the comparison may indicate that the determined first installation position is within a threshold distance of the predetermined installation position, and therefore determine that the satellite terminal 150 does have access rights to the satellite communications system. In other examples determining access rights may be based at least in part on identifying a geographic area associated with the determined installation position of the satellite terminal 150. In some examples determining access rights at step 615 may include determining rights to access a plurality of service beams 125, which may include more than one service beam 125 of the same communications satellite 121, and/or service beams 125 associated with different communications satellites 121. In some examples determining access rights at step 615 may include determining a subscription cost for the satellite terminal 150, which may be based at least in part on the determined installation position, or a change in installation positions. In various examples, the determination of whether the satellite terminal has rights to the satellite communications system based on the determined first installation position may be made by any of the satellite terminal 150, a CPE 160, a gateway 130, or a network device 141.

At step 620, in response to determining the satellite terminal has rights to access the satellite communications system at the customer premises, the exemplary method 600 may include permitting communications between the satellite terminal 150 and a target communications satellite 121 of the satellite communications system. The permitted communications between the satellite terminal 150 and the target communications satellite 121 may include, for example, data service, broadcast service, and the like transmitted between CPEs 160 and one or more networks 140 and/or one or more network devices 141, with the transmissions routed via the target communications satellite 121. In some examples, permitting communications between the satellite terminal and a target satellite may include a beam selection and/or reselection for a satellite terminal 150 to one of a plurality of service beams that the satellite terminal 150 was determined to have rights to access (e.g., for network balancing, service redistribution, etc.). In some examples, permitting communications may be based at least in part on a signal timing offset, where the signal timing offset may be determined from the first installation position of the satellite terminal 150, and in some examples from a determined position of the target communications satellite 121 (e.g., a determined distance between the satellite terminal 150 and the target communications satellite 121). Permitting communications between the satellite terminal and the target communications satellite may be performed, for example, by any of the satellite terminal 150, a CPE 160, a gateway 130, or a network device 141.

Figure 7:
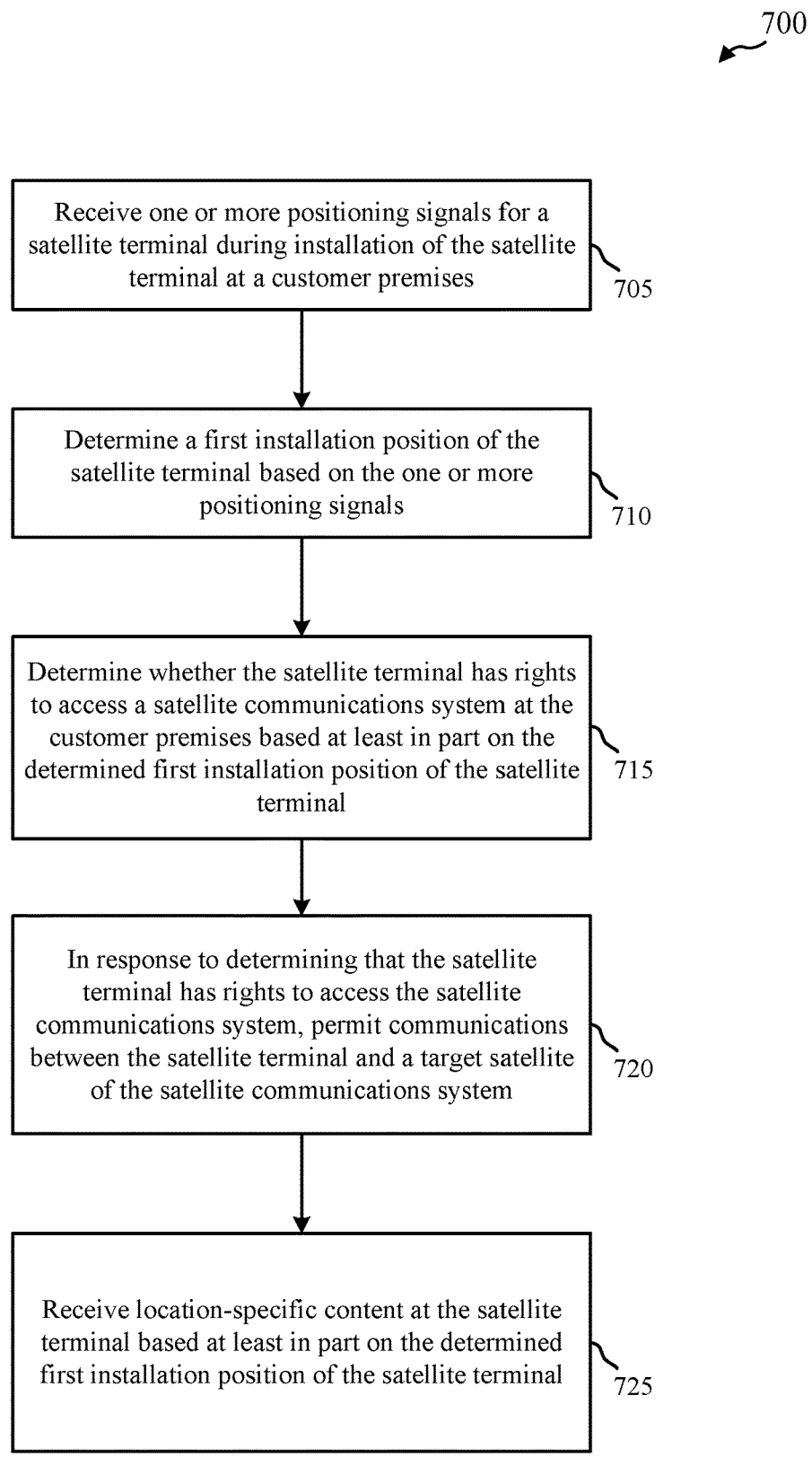

FIG. 7 shows a flowchart illustrating an exemplary method 700 for position-based access to a satellite communications system, in accordance with aspects of the present disclosure. The steps of the exemplary method 700 are described from the perspective of a satellite terminal 150, which is configured to perform each of the described steps 705 through 725 of the exemplary method 700. The satellite terminal 150 may be an example of aspects of a satellite terminal 150 described with reference to FIGS. 1 through 5, and may be configured for communications with a communications satellite via a satellite terminal communications antenna 152, and also be configured to receive positioning signals 115 via a satellite terminal auxiliary antenna 151.

At step 705, the satellite terminal 150 may receive one or more positioning signals for the satellite terminal 150 during installation of the satellite terminal 150 at a customer premises. In various examples a single ranging signal may be received at the satellite terminal 150, or a plurality of positioning signals may be received. In some examples the satellite terminal 150 may be configured to receive a plurality of positioning signals from a GNSS constellation (e.g., a GPS constellation, a GLONASS constellation, etc.), where the signals received from the GNSS constellation are suitable for determining the position of the satellite terminal 150.

At step 710, the satellite terminal 150 may determine a first installation position of the satellite terminal 150 based on the one or more positioning signals 115. For example, the satellite terminal 150 may be configured to perform a calculation (e.g., a ranging calculation, a triangulation, etc.) that uses information included in the positioning signals 115 to determine the installation position of the satellite terminal 150.

At step 715, the satellite terminal 150 may determine whether the satellite terminal 150 has rights to access a satellite communications system at the customer premises based at least in part on the determined first installation position of the satellite terminal 150. For example, the satellite terminal 150 may perform a comparison between a predetermined installation position for the satellite terminal 150 (e.g., an installation position where the satellite terminal 150 was initially installed, an approved installation position for the satellite terminal, etc.) and the determined first installation position. In some examples the comparison performed by the satellite terminal may indicate that the determined first installation position is within a threshold distance of the predetermined installation position, and therefore may determine that the satellite terminal 150 does have access rights to the satellite communications system. In other examples the determination of access rights by the satellite terminal 150 may be based at least in part on identifying a geographic area associated with the determined installation position of the satellite terminal 150.

At step 720, in response to determining the satellite terminal 150 has rights to access the satellite communications system, the satellite terminal may permit communications between the satellite terminal 150 and a target communications satellite 121 of the satellite communications system. In some examples, permitting communications at step 720 may include establishing a communications link between the satellite terminal 150 and the target communications satellite 121, which in some examples may include the satellite terminal transmitting a network entry signal to be received by the target communications satellite 121. In some examples, a transmission timing associated with transmitting the network entry signal may be based at least in part on a signal timing offset determined by the satellite terminal 150. The signal timing offset may, for example, include an approximation of a signal propagation delay for signals transmitted between the satellite terminal 150 and the target communications satellite 121. Thus, the signal timing offset may be determined at least in part from the first installation position of the satellite terminal 150, and in some examples from a determined position of the target communications satellite 121 (e.g., a determined distance between the satellite terminal 150 and the target communications satellite 121). The permitted communications between the satellite terminal 150 and the target communications satellite 121 may include, for example, data service, broadcast service, and the like transmitted between CPEs 160 and one or more networks 140 and/or one or more network devices 141, with the transmissions routed via the target communications satellite 121.

At step 725, the satellite terminal 150 may then receive location-specific content at the satellite terminal 150. For example, the satellite terminal 150, may receive content intended for the time zone in which the satellite terminal 150 is located, content intended for the state or region in which the satellite terminal 150 is located, and the like. In some examples, receiving location-specific content at step 725 may be further associated with a location-specific subscription cost, such as a base fee, a location-specific surcharge or tax, and the like.

Figure 8:
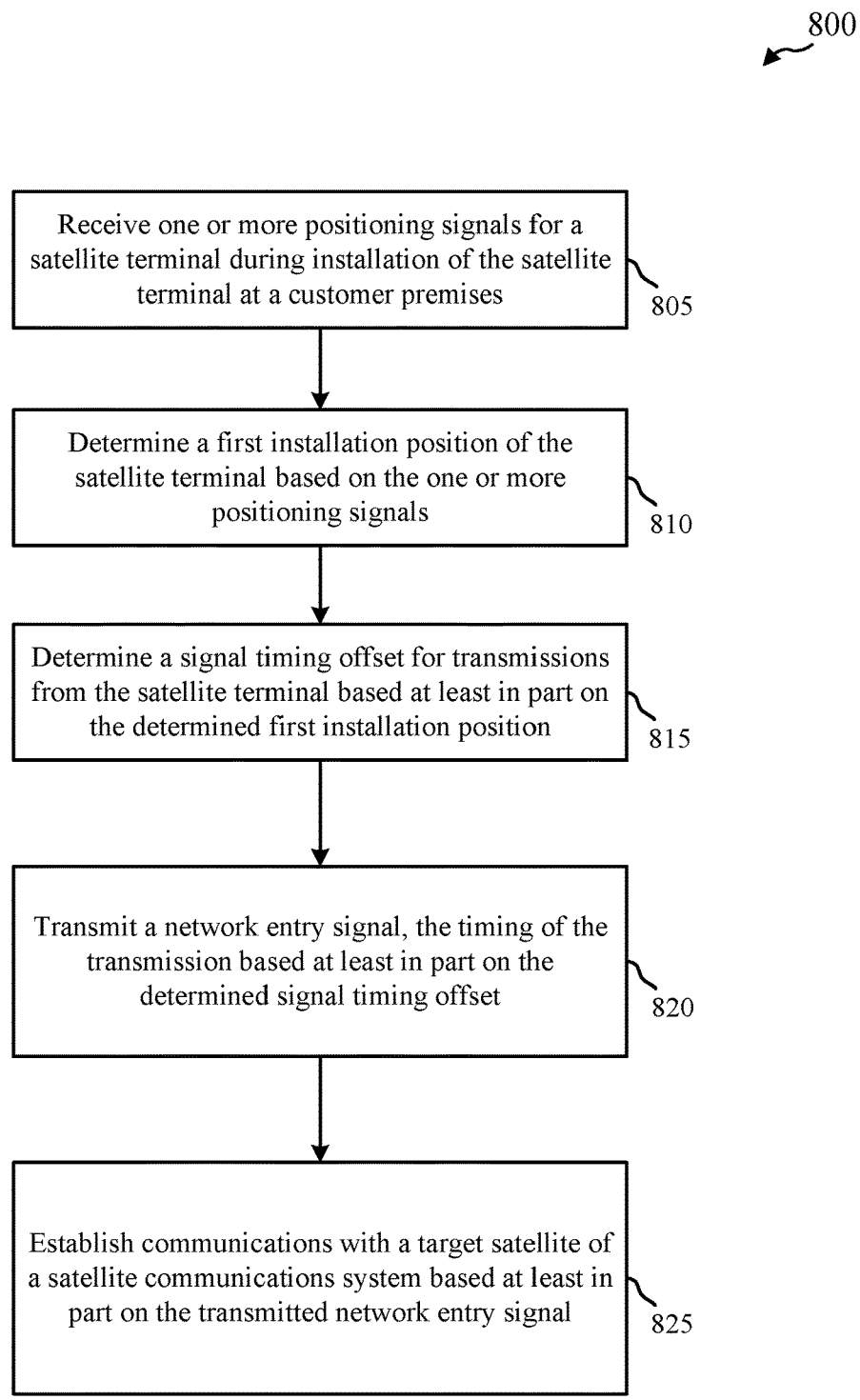

FIG. 8 shows a flowchart illustrating an exemplary method 800 for position-based access to a satellite communications system, in accordance with aspects of the present disclosure. The steps of the exemplary method 800 are described from the perspective of a satellite terminal 150, which is configured to perform each of the described steps 805 through 820 of the exemplary method 800. The satellite terminal 150 may be an example of aspects of a satellite terminal 150 described with reference to FIGS. 1 through 5, and may be configured for communications with a communications satellite via a satellite terminal communications antenna 152, and also be configured to receive positioning signals 115 via a satellite terminal auxiliary antenna 151.

At step 805 of the exemplary method 800, the satellite terminal 150 may receive one or more positioning signals 115 for the satellite terminal 150 during installation of the satellite terminal 150 at a customer premises. In various examples a single ranging signal may be received at the satellite terminal 150, or a plurality of positioning signals may be received. In some examples the satellite terminal 150 may be configured to receive a plurality of positioning signals from a GNSS constellation (e.g., a GPS constellation, a GLONASS constellation, etc.), where the signals received from the GNSS constellation are suitable for determining the position of the satellite terminal 150.

At step 810, the satellite terminal 150 may determine a first installation position of the satellite terminal 150 based on the one or more positioning signals 115.

At step 815, the satellite terminal 150 may determine a signal timing offset for transmissions from the satellite terminal 150 based at least in part on the determined first installation position. The signal timing offset may, for example, include an approximation of a signal propagation delay for signals transmitted between the satellite terminal 150 and the target communications satellite 121, such as the signal timing offsets described with reference to FIGS. 5A and 5B. Thus, the signal timing offset may be determined at least in part from the first installation position of the satellite terminal 150, and in some examples from a determined position of the target communications satellite 121 (e.g., a determined distance between the satellite terminal 150 and the target communications satellite 121). The position of the target communications satellite 121 may be determined by the satellite terminal 150 by any of a predetermined value stored at the satellite terminal 150, a value received from a CPE 160, a gateway 130, or a network device. The position of the target communications satellite 121 may be received from the communications satellite 121 itself, which may be either a signal originating at the target communications satellite 121, or originating at another device of a satellite communications system and communicated via the target communications satellite 121.

At step 820, the satellite terminal 150 may transmit a network entry signal, where the timing of the transmission is based at least in part on the determined signal timing offset. For example, the timing of a transmission of a network entry signal may be calculated using aspects of network entry transmission timing calculations 470 or 570 described with reference to FIGS. 4A, 4B, 5A, and 5B. In some examples, the satellite terminal 150 may have received information associated with a contention slot of the target communications satellite 121 (e.g., contention slot information 435, received from the target communications satellite, as described with reference to FIGS. 4A, 4B, 5A, and 5B). Thus, the timing of the transmission of a network entry signal may be further based on information associated with a contention slot of the target communications satellite 121. The network entry signal may be transmitted in a manner that it can be received by the target communications satellite 121, such as a transmission via a satellite terminal communications antenna 152 of the satellite terminal 150.

At step 825 the satellite terminal 150 may establish communications with a target communications satellite of a satellite communications system based at least in part on the transmitted network entry signal. For example, after transmitting the network entry signal, the satellite terminal may receive one or more signals from the target communications satellite 121 which establishes communications parameters such as control information, available and/or dedicated RF resources, timing information, or the like. Upon establishing communications with the target communications satellite, the satellite terminal 150 may provide communications between various devices via the target communications satellite, such as communications between CPEs 160 associated with the satellite terminal and one or more of a gateway 130, a network 140, and/or a network device 141.

In some examples establishing communications with the target communications satellite 121 may be followed by receiving a signal from the target communications satellite 121 that is used to adjust the signal timing offset determined in step 815 (e.g., a correction signal that can be used to bring the determined signal timing offset closer to the propagation delay, or otherwise improve the synchronization between the satellite terminal 150 and the target communications satellite 121). In some examples establishing communications with the target communications satellite 121 may be followed by receiving a subsequent positioning signal at the satellite terminal 150 (e.g., indicating movement of the satellite terminal 150 to a new installation position), and adjusting the signal timing offset based at least in part on the subsequent positioning signal. For example, an indicated change in installation position of the satellite terminal may indicate that the satellite terminal 150 is farther away from the communications satellite 121, and the signal timing offset for the satellite terminal 150 may be increased accordingly. In some examples, after establishing communications with the target satellite, the satellite terminal 150 may save various communications parameters in memory at the satellite terminal 150, such as the determined installation position, the determined signal timing offset, or the like, and parameters saved to memory (e.g., LKG parameters) may be used during a subsequent establishment of communications in the event that positioning signals are no longer received at the satellite terminal 150.

Thus, exemplary methods 600, 700, and 800 provide methods for position-based access to a satellite communications system based on positioning signals received at a satellite terminal. It should be noted that exemplary methods 600, 700, and 800 describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the present disclosure may be implemented in various combinations to provide various methods for position-based access to a satellite communications system based on positioning signals received at a satellite terminal.

Figure 9:
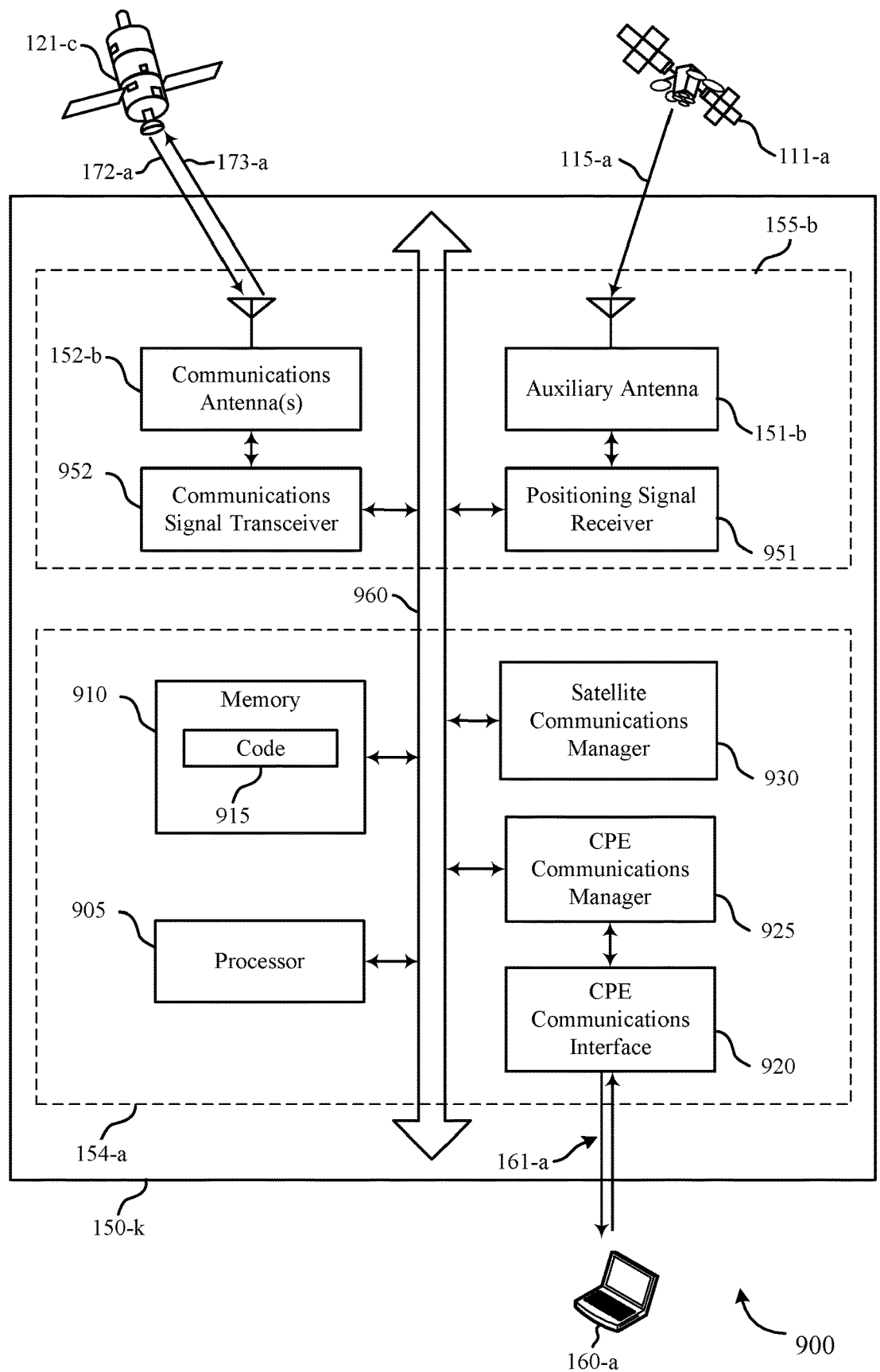
FIG. 9 shows a block diagram illustrating a satellite communications environment, in accordance with aspects of the present disclosure.

FIG. 9 shows a block diagram illustrating a satellite communications environment 900, in accordance with aspects of the present disclosure. The satellite communications environment 900 may be an example of the satellite communications environment 100 described with reference to FIG. 1. The satellite communications environment 900 includes a satellite terminal 150-$k$, which may be an example aspects of satellite terminals 150 described with reference to FIGS. 1 through 8. The satellite terminal 150-$k$ may include a processor 905, and memory 910. The memory 910 may store computer-readable, computer-executable software or firmware code 915 including instructions that, when executed by the processor, cause the satellite terminal 150-$k$ to perform various functions described herein (e.g., receiving positioning signals to be employed in position-based access to a satellite communications system, etc.). In some examples, the code 915 may not be directly executable by the processor but may cause a computer (e.g., when compiled and executed) to perform functions described herein. The processor 905 may include an intelligent hardware device, (e.g., a CPU, a microcontroller, an ASIC, etc.). The memory 910 may also store configuration parameters for communications via the satellite terminal 150-$k$, including parameters for establishing communications (e.g., satellite information, beam information, subscriber information, LKG parameters, etc.) Each of the components of the satellite terminal 150-$a$ may communicate, directly or indirectly, with one another (e.g., via one or more buses 960).

The satellite terminal 150-$k$ may be configured to communicate with one or more communications satellites (e.g., communications satellite 121-$c$), which may be an example of aspects of a communications satellite 121 of a communications satellite system as described with reference to FIGS. 1 through 8. The satellite terminal 150-$k$ may be configured to establish a communications link with the communications satellite 121-$c$ employing a satellite terminal communications antenna 152-$b$ and a communications signal transceiver 952. The communications link may support bi-directional communications via forward link signals 172-$a$ and/or return link signals 173-$a$ between the satellite terminal 150-$k$ and the communications satellite 121-$c$.

The communications signal transceiver 952 may include various circuits and/or processors to support receiving, transmitting, converting, coding, and/or decoding of forward link signals 172-$a$ and/or return link signals 173-$a$. For example, the communications signal transceiver 952 may include a modem to modulate the packets and provide the modulated packets to the satellite terminal communications antenna 152-$b$ for transmission, and to demodulate packets received from the satellite terminal communications antenna 152-$b$. As illustrated in the present example, the satellite terminal 150-$k$ includes a single satellite terminal communications antenna 152-$b$. However, in some cases the satellite terminal 150-$k$ may have more than one satellite terminal communications antenna 152, which may be capable of concurrently transmitting or receiving multiple wireless transmissions and/or be configured to support various beamforming techniques.

The satellite terminal 150-$k$ may be configured to receive positioning signals 115-$a$. In some examples positioning signals 115-$a$ may be received from one or more auxiliary satellites (e.g., auxiliary satellite 111-$a$), which may be an example of aspects of an auxiliary satellite 111 described with reference to FIGS. 1 through 8. In some examples the auxiliary satellite 111-$a$ may be a GNSS satellite (e.g., a GPS satellite or a GLONASS satellite). Additionally or alternatively, positioning signals 115-$a$ may be received from another source, such as a land-based system that transmits one or more positioning signals 115-$a$.

The satellite terminal 150-$k$ may receive positioning signals 115-$a$ via a satellite terminal auxiliary antenna 151-$b$ and an positioning signal receiver 951. The positioning signal receiver 951 may include various circuits and/or processors to support receiving, converting, and/or decoding of positioning signals 115-$a$. For example, the positioning signal receiver 951 may include a modem to demodulate packets received from the satellite terminal auxiliary antenna 151-$b$ via positioning signals 115-$a$. In some examples the positioning signal receiver 951 may include circuits and/or processors configured to determine an installation position of the satellite terminal 150-$k$ based on the received positioning signals 115-$a$, and/or associate positioning signals 115-$a$ with a position of the auxiliary satellite 111-$a$ when respective positioning signals 115-$a$ are transmitted.

The satellite terminal 150-$k$ may be configured to support communications with one or more CPEs (e.g., CPE 160-$a$) via signals transmitted over wired or wireless connection(s) 161-$a$. The satellite terminal 150-$k$ may employ a CPE communications interface 920 supporting any number of wired and/or wireless links between the satellite terminal 150-$k$ and the one or more CPEs 160, which may be managed by a CPE communications manager 925. As illustrated by the present example, the CPE communications manager 925 may implemented as a separate module of the satellite terminal 150-$k$, which may be configured as a standalone set of instructions (e.g., a software module having a set of instructions stored in memory) and/or a separate processing element (e.g., a standalone central processing unit (CPU), microcontroller, application specific integrated circuit (ASIC), field programmable gate array (FPGA), or other like integrated circuit (IC)). In other examples, some or all of the operations of the CPE communications manager 925 may be caused by instructions stored in the memory 910 (e.g., a portion of the code 915), which in some examples may be performed by the processor 905.

The satellite terminal 150-$k$ may include a satellite communications manager 930, configured to manage various aspects of communications between the satellite terminal 150-$k$ and each of the communications satellite 121-$c$ and the auxiliary satellite 111-$a$. The satellite communications manager 930 may control and/or configure various components of the satellite terminal perform the one or more operations of the exemplary methods 600, 700, or 800 described with reference to FIGS. 6, 7, and 8. For example, the satellite communications manager 930 may manage aspects of the operation of the satellite terminal 150-$k$ to receive the positioning signals 115-$a$, determine an installation position of the satellite terminal 150-$k$ based on the received positioning signals 115-$a$, determine whether the satellite terminal 150-$k$ has rights to access the satellite communications system at a customer premises based on the determined installation position, and permit communications between the satellite terminal 150-$k$ and the communications satellite 121-$c$. In another example, the satellite communications manager 930 may manage aspects of the operation of the satellite terminal 150-$k$ to receive the positioning signals 115-$a$, determine an installation position of the satellite terminal 150-$k$ based on the received positioning signals 115-$a$, determine a signal timing offset for transmissions from the satellite terminal 150-$k$ (e.g., an approximation of a propagation delay), transmit a network entry signal to the communications satellite 121-c with transmission timing based on the determined signal timing offset, and establish communications with the communications satellite 121-c based on the transmitted network entry signal.

As illustrated by the present example, the satellite communications manager 930 may implemented as a separate module of the satellite terminal 150-k, which may be configured as a standalone set of instructions (e.g., a software module having a set of instructions stored in a standalone portion of memory) and/or a separate processing element (e.g., a standalone CPU, microcontroller, ASIC, FPGA, or other like IC). In other examples, some or all of the operations of the satellite communications manager 930 may be caused by instructions stored in the memory 910 (e.g., a portion of the code 915), which in some examples may include steps performed by the processor 905.

In various examples, the components of the satellite terminal 150-k may be divided into subassemblies, where various components may be included in a subassembly either in part, or in its entirety. For example, the satellite terminal 150-k may include a satellite terminal subassembly 155-b and a satellite terminal receiver 154-a, which may be referred to as an ODU and an IDU respectively. The satellite terminal antenna assembly 155-b may include the communications antenna(s) 152-b, the communications signal transceiver 952, the satellite terminal auxiliary antenna 151-b, and the positioning signal receiver 951, along with any additional circuitry, processing, and/or memory to support the functionality of the satellite terminal antenna assembly 155-b. The satellite terminal receiver 154-a may include the satellite communications manager 930, the CPE communications manager 925, the CPE communications interface 920, processor 905, and memory 910, along with any additional circuitry, processing, and/or memory to support the functionality of the satellite terminal receiver 154-a. The satellite terminal antenna assembly 155-b may communicate with the satellite terminal receiver 154-a via a bus 960, which in various examples may support wired and/or wireless communications. Although the components of the satellite terminal 150-k are shown as being distributed between two subassemblies (e.g., the satellite terminal antenna assembly 155-b and the satellite terminal receiver 154-a), the components of a satellite terminal 150, or their respective functionality, may be distributed into any number of subassemblies, or may be a single integrated assembly.

Figure 10:
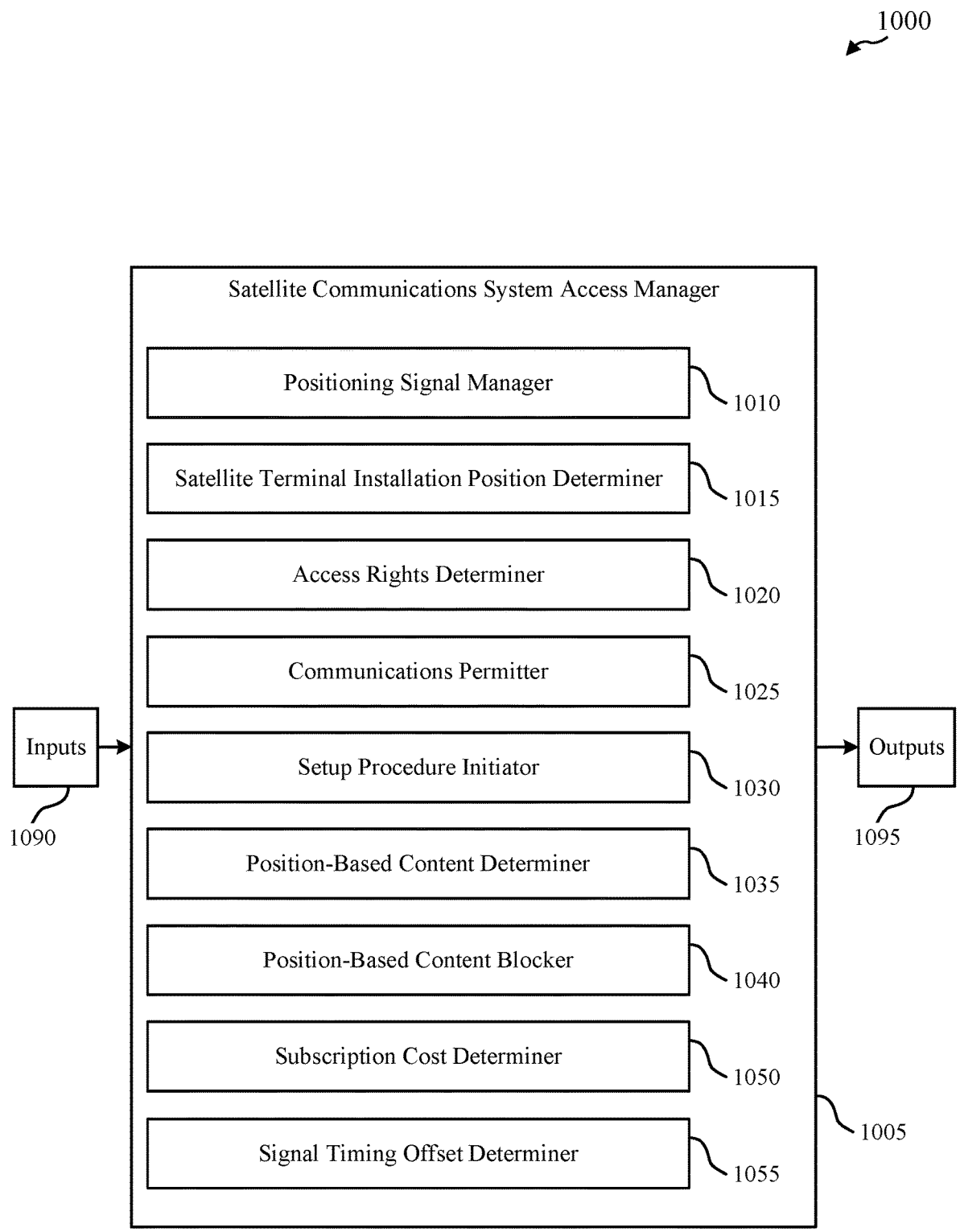
FIG. 10 shows a block diagram of a satellite communications system access manager, in accordance with aspects of the present disclosure.

FIG. 10 shows a block diagram 1000 of a satellite communications system access manager 1005, in accordance with aspects of the present disclosure. The satellite communications system access manager 1005 may be a portion of any of a satellite terminal 150, a CPE 160, a gateway 130, or a network device 141. For example, the satellite communications system access manager 1005 may be a portion of a satellite terminal 150, operating with a shared processor and memory of the satellite terminal 150. In other examples the satellite communications system access manager 1005 may be a standalone component of a satellite terminal 150, receiving inputs from and sending outputs to other components of the satellite terminal 150. In other examples, the satellite communications system access manager 1005 may be or form a portion of a CPE 160 or a network device 141, which manages access of one or more satellite terminals 150 to a satellite communications system. The satellite communications system access manager 1005 may also be or include a processor. Each of the components of the satellite communications system access manager 1005 may be in communication with each other to provide the functions described herein. The satellite communications system access manager 1005 may be configured to receive inputs 1090, and deliver outputs 1095 by various means, including wired or wireless communications, control interfaces, user interfaces, or the like.

The satellite communications system access manager 1005 may include a positioning signal manager 1010, which may perform any of the aspects receiving a positioning signal described with reference to FIGS. 1 through 9. For example, where the satellite communications diagnostic manager is a portion of a satellite terminal 150, the positioning signal manager 1010 may receive one or more positioning signals 115 via a satellite terminal auxiliary antenna 151. In various examples the one or more positioning signals 115 may be received from a variety of land, air, or orbiting devices. In some examples the one or more positioning signals 115 may be received from an auxiliary satellite 111, such as a GNSS satellite. In examples where the satellite communications system access manager 1005 is a portion of a CPE 160, a gateway 130, or a network device 141, the positioning signal manager 1010 may receive at least a portion of one or more positioning signals 115 via inputs 1090 as forwarded from a satellite terminal 150.

The satellite communications system access manager 1005 may include a satellite terminal installation position determiner 1015, which may perform any of the aspects of determining a satellite terminal installation position based on positioning signals received at a satellite terminal 150, as described with reference to FIGS. 1 through 9. For example, the satellite terminal installation position determiner 1015 may receive positioning signals from the positioning signal manager 1010 and perform calculations (e.g., range and orientation calculations, triangulation, etc.) using information of the positioning signals to determine an installation position of a subscriber. In some examples the satellite terminal installation position determiner 1015 may instead receive an already determined installation position of the satellite terminal 150 via inputs 1090, as determined by another device. For example, a satellite terminal 150 may receive positioning signals 115 at a satellite terminal auxiliary antenna 151, calculate an installation position based on the received positioning signals 115, and then forward the determined installation position to the device including the satellite communications system access manager 1005. In some examples the satellite communications system access manager 1005 may not be receiving positioning signals (e.g., due to positioning signals not being transmitted, failure of a positioning signal manager 110, etc.), and the satellite terminal installation position determiner 1015 may rely on LKG parameters to determine an installation position of the satellite terminal. Thus, the satellite terminal position determiner 1015 may determine an installation position through various means.

The satellite communications system access manager 1005 may include an access rights determiner 1020, which may perform any of the aspects of determining whether a satellite terminal 150 has rights to access a satellite communications system at a customer premises based on a determined satellite terminal installation position, as described with reference to FIGS. 1 through 10. For example, the access rights determiner 1020 may compare the determined installation position to a predetermined position (e.g., an installation position, an approved position, etc.), and/or may identify that the determined installation position is within a certain geographical area (e.g., nation, state, time zone, service area, land-based area, etc.). Thus, the access rights determiner 1020 can determine access rights for a satellite terminal 150 based on various interpretations of the determined satellite terminal installation position.

The satellite communications system access manager 1005 may include a communications permitter 1025, which may perform any of the aspects of permitting communications between a satellite terminal 150 and a target communications satellite 121 as described with reference to FIGS. 1 through 10. For example, the communications permitter may provide an authorization for a satellite terminal 150 to access a satellite communications system via a target communications satellite 121. In examples where the satellite communications system access manager 1005 is a portion of a satellite terminal 150, the communications permitter 1025 may provide a control message or flag that authorizes the satellite terminal 150 to perform an access procedure. In some examples the satellite communications system access manager 1005 is a portion of any of a satellite terminal 150, a CPE 160, a gateway 130, or a network device 141, and the communications permitter may send a control message to another device via outputs 1095 that may coordinate an access procedure between a satellite terminal 150 and other devices of the satellite communications system.

The satellite communications system access manager 1005 may include a setup procedure initiator 1030, which may perform any of the aspects of initiating a setup procedure between a satellite terminal 150 and a target communications satellite 121 as described with reference to FIGS. 1 through 10. For example, where the satellite communications system access manager 1005 is a portion of any of a satellite terminal 150, a CPE 160, a gateway 130, or a network device 141, the setup procedure initiator 1030 may initiate a setup procedure between a satellite terminal 150 and various devices of a satellite communications system. For example, the setup procedure initiator 1030 may initiate a setup procedure by sending a message to a communications satellite 121 and/or a gateway 130 to perform aspects of establishing a communications link with the satellite terminal 150. In other examples, the setup procedure initiator 1030 may initiate a setup procedure by sending a message to the satellite terminal 150, to perform aspects of establishing a communications link with one or more of a communications satellite 121, a gateway 130, or a network device 141. In various examples the setup procedure initiator 1030 may select a service and/or reselect a service beam 125 for a satellite terminal 150 from a plurality of service beams 125 that a satellite terminal 150 was determined to have rights to access. Additionally or alternatively, the setup procedure initiator 1030 may initiate a setup procedure based on communications being permitted between the satellite terminal 150, and/or based on an identification of a change of position of the satellite terminal 150.

The satellite communications system access manager 1005 may include a position-based content determiner 1035, which may perform any of the aspects of determining content for a satellite terminal 150 based on a determined satellite terminal installation position as described with reference to FIGS. 1 through 10. For example, where the satellite communications system access manager 1005 is a portion of a satellite terminal 150 or a CPE 160, the position-based content determiner 1035 may be configured to receive certain content via a communications satellite 121, where the content is based on the determined installation position of the associated satellite terminal 150. In examples where the satellite communications system access manager 1005 is a portion of a gateway 130 or a network device 141, the position-based content determiner 1035 may determine, package, encode, and/or transmit content intended to be received by a satellite terminal 150 based on the determined position of the satellite terminal 150. Thus, in various examples of a satellite communications system access manager 1005, a position-based content determiner 1035 may perform various operations associated with content delivery based on a determined installation position of a satellite terminal 150.

The satellite communications system access manager 1005 may include a position-based content blocker 1040, which may perform any of the aspects of blocking communications between a satellite terminal 150 and a target communications satellite 121 based on a determined satellite terminal installation position, as described with reference to FIGS. 1 through 10. For example, where the satellite communications system access manager 1005 is a portion of any of a satellite terminal 150, a CPE 160, a gateway 130, or a network device 141, the position-based content blocker 1040 may prevent certain content from passing through any one or more of the devices of a satellite communications system based on the determined installation position of a satellite terminal. For example, certain content may be broadcast by a communications satellite 121, but a position-based content blocker 1040 may prevent portions of the broadcast content from being passed from a satellite terminal 150 to associated CPEs 160, based on the determined installation position of the satellite terminal 150. In some examples the position-based content blocker 1040 may prevent certain content from being passed from a gateway 130 to a communications satellite 121, based on an installation position determined for a satellite terminal 150 that the content was to be received by. Thus, the position-based content blocker can block portions of content from passing through various portions of a satellite communications system, based on an installation position determined for a satellite terminal 150 associated with sending and/or receiving the content.

The satellite communications system access manager 1005 may include a subscription cost determiner 1050, which may perform any of the aspects of determining a subscription cost for a satellite terminal 150 as described with reference to FIGS. 1 through 10. For example, the subscription cost determiner 1050 may determine a subscription cost based at least in part on a terrestrial or administrative region, such determining a subscription cost based on a state, a country, or any other subscription region associated with a position determined by the satellite terminal installation position determiner 1015. In various examples, the subscription cost determiner 1050 may be used to adjust a base subscription cost, a tax rate, a location-dependent surcharge, a location-specific demand fee, or the like. In other examples the subscription cost determiner 1050 may determine a subscription cost based on identified movement of a satellite terminal from one location to another, such as determining a relatively lower subscription cost for a satellite terminal installed at a first installation position and a relatively higher subscription cost for a terminal that is determined to have been moved to a second installation position (e.g., as identified from positioning signals received at the satellite terminal). In some examples, satellite terminal installation positions determined by the satellite terminal installation position determiner 1015 may be used by the subscription cost determiner to determine whether a satellite terminal is used as expected (e.g., according to a subscriber agreement, such as determining that a satellite terminal having a stationary installation subscriber agreement being used as a nomadic satellite terminal that may be moved between a number of different installation sites, customer premises, etc.), and the received positioning signals may be used to identify or trigger changes in a subscription cost or a subscription service by the subscription cost determiner 1050.

The satellite communications system access manager 1005 may include a signal timing offset determiner 1055, which may perform any of the aspects of determining a signal timing offset for transmissions between a satellite terminal 150 and a communications satellite 121 as described with reference to FIGS. 1 through 10. For example, the signal timing offset determiner 1055 may perform a calculation to approximate a signal propagation delay between devices of a satellite communications system, based at least in part on a determined installation position of a satellite terminal. The determined signal timing offset may be used within a device that contains the satellite communications system access manager 1005, or may be communicated to another device of a satellite communications system, such as a gateway 130, a communications satellite 121, and/or a satellite terminal 150.

The components of the satellite communications system access manager 1005, individually or collectively, may be implemented with at least one ASIC adapted to perform some or all of the applicable features in hardware. Alternatively, the features may be performed by one or more other processing units (or cores), on at least one IC. In other examples, other types of integrated circuits may be used (e.g., Structured/Platform ASICs, a FPGA, or another semi-custom IC), which may be programmed in any manner known in the art. The features may also be implemented, in whole or in part, with instructions embodied in a memory, formatted to be executed by one or more general or application-specific processors.

Figure 11:
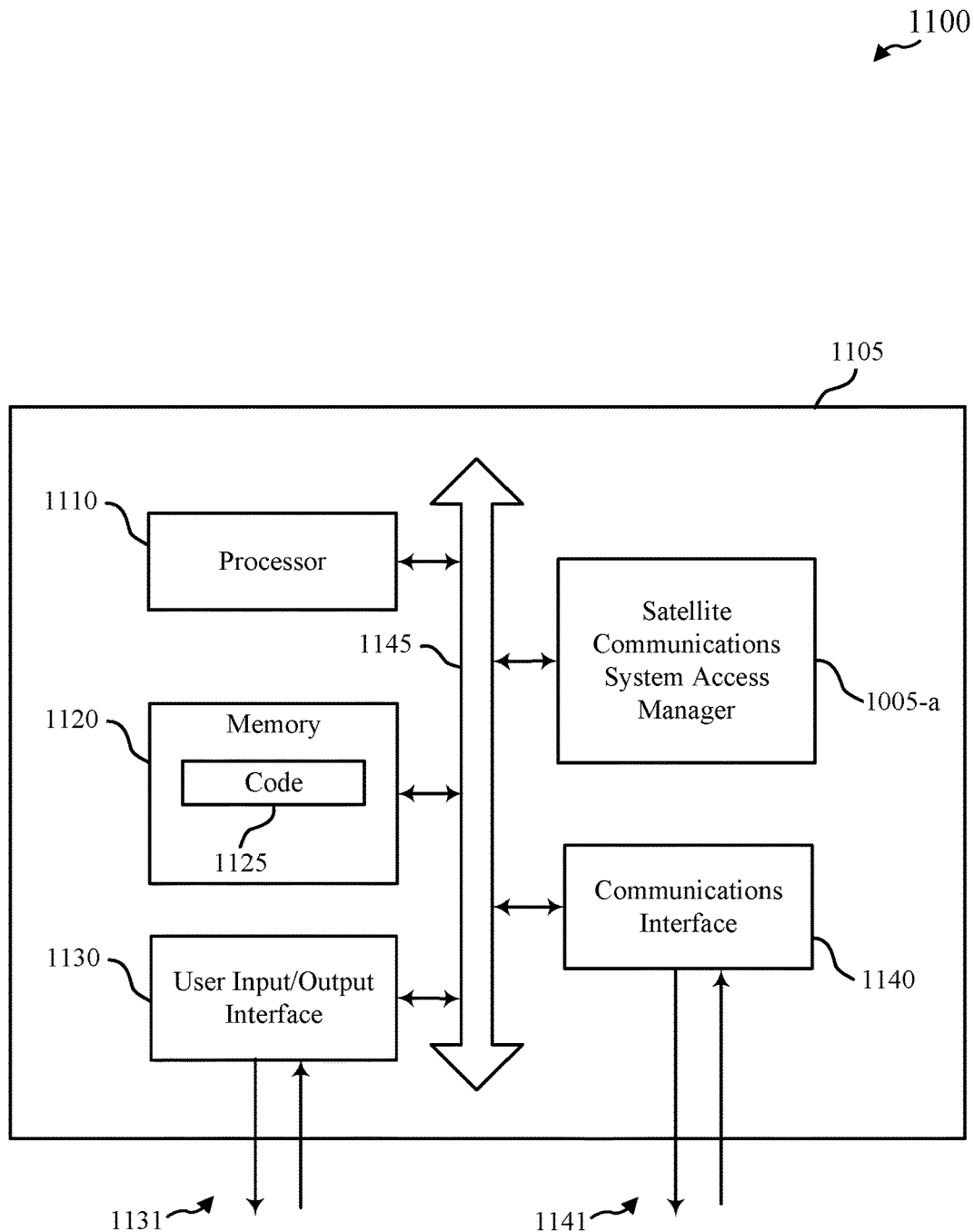
FIG. 11 illustrates a block diagram of an apparatus configured for position-based access to a satellite communications system based on positioning signals received at a satellite terminal, in accordance with aspects of the present disclosure.

FIG. 11 illustrates a block diagram 1100 of an apparatus 1105 configured for position-based access to a satellite communications system based on positioning signals received at a satellite terminal, in accordance with aspects of the present disclosure. The apparatus 1105 may be any of a satellite terminal 150, a CPE 160, a gateway 130, or a network device 141 as described with reference to FIGS. 1 through 10. The apparatus 1105 may include a processor 1110, memory 1120, a user input/output interface 1130, and a communications interface 1140. The apparatus 1105 may also include a satellite communications system access manager 1005-a, which may be an example of aspects of the satellite communications system access manager 1005 described with reference to FIG. 10. Each of these modules may communicate, directly or indirectly, with one another (e.g., via one or more buses 1145).

The memory 1120 may include RAM and/or ROM. The memory 1120 may store computer-readable, computer-executable software or firmware code 1125 including instructions that, when executed by the processor, cause the apparatus 1105 to perform various functions described herein (e.g., determining position-based access to a satellite communications system, etc.). In some cases, the code 1125 may not be directly executable by the processor but may cause a computer (e.g., when compiled and executed) to perform functions described herein. The processor 1110 may include an intelligent hardware device, (e.g., a CPU, a microcontroller, an ASIC, etc.)

The user input/output interface 1130 may provide any suitable input and/or output functionality 1131 to support the operation of the apparatus 1105 by a user. For example, the user input/output interface 1130 may provide buttons, a keyboard, a wired or wireless control interface, and the like to receive inputs from user during the operation of the apparatus 1105. The user input/output interface may also provide lights, LEDs, a screen, a speaker, a wired or wireless control interface, and the like for providing output to the user to indicate various functions of the apparatus 1105 during operation.

The communications interface 1140 may provide bidirectional communications 1141, via one or more antennas, wired, or wireless links, with one or more networks, as described above. For example, the communications interface 1140 may communicate bi-directionally with any one or more of a satellite (e.g., a communications satellite 121 and/or an auxiliary satellite 111), a satellite terminal 150, a CPE 160, a gateway 130, or a network device 141. The communications interface 1140 may also include a modem to modulate the packets and provide the modulated packets to the antennas for transmission, and to demodulate packets received from the antennas.

As illustrated by the present example, the satellite communications system access manager 1005-a may be implemented as a separate module of the apparatus 1105, which may be configured as a standalone set of instructions (e.g., a software module having a set of instructions stored in a standalone portion of memory) and/or a separate processing element (e.g., a standalone CPU, microcontroller, ASIC, FPGA, or other like IC). In other examples, some or all of the operations of the satellite communications system access manager 1005-a may be caused by instructions stored in the memory 1120 (e.g., a portion of the code 1125), which in some examples may be performed by the processor 1110.

Although the descriptions above recite an auxiliary satellite system and a satellite communications system (e.g., auxiliary satellite system including one or more auxiliary satellites 111 and satellite communications system described with reference to FIGS. 1 through 11), a particular satellite may be included in both the auxiliary satellite system and the satellite communications system. For example, a satellite terminal 150 may have established a communications link with a communications satellite 121, and also be receiving a positioning signal 115 from the communications satellite 121. In some examples the satellite terminal 150 may have established a communications link with a first communications satellite 121, and be receiving a positioning signal 115 from a second communications satellite 121 that is used to determine the installation position of the satellite terminal 150. For various reasons, the satellite terminal 150 may subsequently establish a communications link with the second communications satellite 121. Thus, the second communications satellite 121 may be part of an auxiliary satellite system in relation to determining the installation position of a satellite terminal 150, and part of a satellite communications system in relation to providing communications with the satellite terminal 150. In other words, at various times a satellite may perform the steps pertaining to either of an auxiliary satellite system or a satellite communications system.

The detailed description set forth above in connection with the appended drawings describes examples and does not represent the only examples that may be implemented or that are within the scope of the claims. The term "example," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical positions. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for use in a satellite communications system, comprising:
   receiving a plurality of positioning signals for a satellite terminal;
   determining a first installation position of the satellite terminal based on the plurality of positioning signals;
   identifying that the satellite terminal is within a first geographic region based on the determined first installation position;
   determining whether the satellite terminal has rights to access the satellite communications system at the first installation position based at least in part on the satellite terminal being within the first geographic region; and
   in response to determining the satellite terminal has rights to access the satellite communications system within the first geographic region, permitting communications between the satellite terminal and a target satellite of the satellite communications system, wherein the communications comprise position-specific content of a set of content accessed according to a subscriber agreement, the position-specific content based at least in part on the first installation position of the satellite terminal being within the first geographic region.

2. The method of claim 1, further comprising:
   attempting to reestablish a communication link with the satellite communications system at a second installation position associated with a second geographic region; and
   denying access to the satellite communications system at the second installation position based at least in part on the satellite terminal being within the second geographic region.

3. The method of claim 1, further comprising:
attempting to reestablish a communication link with the satellite communications system at a second installation position associated with a second geographic region; and
allowing access to the satellite communications system at the second installation position based at least in part on the satellite terminal being within the second geographic region, wherein the second geographic region is associated with a changed communication service than the first geographic region.

4. The method of claim 3, wherein the changed communication service associated with the second geographic region comprises a different content, a different subscription cost, or both, than the first geographic region.

5. The method of claim 1, wherein the determining whether the satellite terminal has rights to access the satellite communications system is performed upon initiating a terminal setup procedure for the satellite terminal.

6. The method of claim 1, further comprising:
restricting access to second content based at least in part on the first installation position of the satellite terminal being within the first geographic region.

7. The method of claim 1, wherein the first geographic region comprises a service area.

8. The method of claim 1, wherein the first geographic region comprises a national region, a state region, a municipal region, or a time zone.

9. The method of claim 1, wherein the plurality of positioning signals are received from a plurality of positioning satellites.

10. The method of claim 9, wherein the plurality of positioning satellites are included in a global navigation satellite system constellation.

11. The method of claim 1, wherein permitting communications between the satellite terminal and the target satellite comprises:
determining a signal timing offset based at least in part on the determined first installation position of the satellite terminal; and
permitting communications based at least in part on the determined signal timing offset.

12. The method of claim 11, further comprising:
receiving a subsequent positioning signal at the satellite terminal; and
adjusting the signal timing offset based at least in part on the subsequent positioning signal.

13. The method of claim 12, further comprising:
receiving an adjustment signal from the target satellite; and
adjusting the signal timing offset based at least in part on the received adjustment signal.

14. A satellite terminal, comprising:
a positioning signal receiver;
a communication signal transceiver;
a processor;
memory in electronic communication with the processor; and
instructions stored in the memory and executable by the processor to cause the satellite terminal to:
receive a plurality of positioning signals for the satellite terminal;
determine a first installation position of the satellite terminal based on the plurality of positioning signals;
identify that the satellite terminal is within a first geographic region based on the determined first installation position;
determine whether the satellite terminal has rights to access a satellite communications system at the first installation position based at least in part on the satellite terminal being within the first geographic region; and
in response to determining the satellite terminal has rights to access the satellite communications system within the first geographic region, permit communications between the satellite terminal and a target satellite of the satellite communications system, wherein the communications comprise position-specific content of a set of content accessed according to a subscriber agreement, the position-specific content based at least in part on the first installation position of the satellite terminal being within the first geographic region.

15. The satellite terminal of claim 14, wherein the instructions are executable by the processor to cause the satellite terminal to:
attempt to reestablish a communication link with the satellite communications system at a second installation position associated with a second geographic region; and
deny access to the satellite communications system at the second installation position based at least in part on the satellite terminal being within the second geographic region.

16. The satellite terminal of claim 14, wherein the instructions are executable by the processor to cause the satellite terminal to:
attempt to reestablish a communication link with the satellite communications system at a second installation position associated with a second geographic region; and
allow access to the satellite communications system at the second installation position based at least in part on the satellite terminal being within the second geographic region, wherein the second geographic region is associated with a changed communication service than the first geographic region.

17. The satellite terminal of claim 16, wherein the changed communication service associated with the second geographic region comprises a different content, a different subscription cost, or both, than the first geographic region.

18. The satellite terminal of claim 14, wherein the instructions to determine whether the satellite terminal has rights to access the satellite communications system are performed upon initiating a terminal setup procedure for the satellite terminal.

19. The satellite terminal of claim 14, wherein the instructions are executable by the processor to cause the satellite terminal to:
restrict access to second content based at least in part on the first installation position of the satellite terminal being within the first geographic region.

20. The satellite terminal of claim 14, wherein the first geographic region comprises a service area.

21. The satellite terminal of claim 14, wherein the first geographic region comprises a national region, a state region, a municipal region, or a time zone.

22. The satellite terminal of claim 14, wherein the instructions to permit communications between the satellite terminal and the target satellite comprise instructions to:

determine a signal timing offset based at least in part on the determined first installation position of the satellite terminal; and permit communications based at least in part on the determined signal timing offset.

23. The satellite terminal of claim 22, wherein the instructions are executable by the processor to cause the satellite terminal to:

receive a subsequent positioning signal at the satellite terminal; and adjust the signal timing offset based at least in part on the subsequent positioning signal.

24. The satellite terminal of claim 22, wherein the instructions are executable by the processor to cause the satellite terminal to:

receive an adjustment signal from the target satellite; and adjust the signal timing offset based at least in part on the received adjustment signal.

\* \* \* \* \*